United States Patent
Liu et al.

(10) Patent No.: US 9,924,546 B2
(45) Date of Patent: Mar. 20, 2018

(54) METHOD AND DEVICE FOR SENDING AND RECEIVING RANDOM ACCESS SEQUENCE

(71) Applicant: ZTE Corporation, Shenzhen (CN)

(72) Inventors: Kun Liu, Shenzhen (CN); Bo Dai, Shenzhen (CN); Shuqiang Xia, Shenzhen (CN); Zhaohua Lu, Shenzhen (CN); Huiying Fang, Shenzhen (CN); Jing Shi, Shenzhen (CN); Xincai Lin, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 296 days.

(21) Appl. No.: 14/761,715

(22) PCT Filed: Oct. 23, 2013

(86) PCT No.: PCT/CN2013/085814
§ 371 (c)(1),
(2) Date: Jul. 17, 2015

(87) PCT Pub. No.: WO2014/110925
PCT Pub. Date: Jul. 24, 2014

(65) Prior Publication Data
US 2015/0359007 A1 Dec. 10, 2015

(30) Foreign Application Priority Data
Jan. 18, 2013 (CN) .......................... 2013 1 0019708

(51) Int. Cl.
*H04W 74/08* (2009.01)
*H04W 72/04* (2009.01)
(Continued)

(52) U.S. Cl.
CPC ....... *H04W 74/0866* (2013.01); *H04L 5/0005* (2013.01); *H04L 5/0053* (2013.01);
(Continued)

(58) Field of Classification Search
CPC .............. H04L 5/0005; H04L 5/0053; H04W 74/0866; H04W 72/0446; H04W 88/08;
(Continued)

(56) References Cited

U.S. PATENT DOCUMENTS

| 2007/0291696 A1 | 12/2007 | Zhang | |
| 2010/0232318 A1* | 9/2010 | Sarkar | H04W 28/18 370/254 |
| 2015/0103770 A1* | 4/2015 | Chang | H04W 76/027 370/329 |

FOREIGN PATENT DOCUMENTS

| CN | 101668328 A | 3/2010 |
| CN | 102238752 A | 11/2011 |

(Continued)

OTHER PUBLICATIONS

International Search Report for corresponding application PCT/CN2013/085514 filed Oct. 23, 2013; dated Jan. 30, 2014.
European Search Report for corresponding application EP13871793; Report dated Dec. 11, 2015.

*Primary Examiner* — Jae Y Lee
*Assistant Examiner* — Jean F Voltaire
(74) *Attorney, Agent, or Firm* — Cantor Colburn LLP

(57) ABSTRACT

A method and device for sending and receiving a random access sequence, wherein the method for sending a random access sequence includes: determining one or more preset random access resources forming a Physical Random Access Channel (PRACH); and sending a first random access sequence on the one or more preset random access resources. By the disclosure, the problem that an access requirement cannot be met by a random access sequence processing method in a related art is solved, and the effect of improving random access efficiency and accuracy is further achieved.

17 Claims, 9 Drawing Sheets

(51) Int. Cl.
*H04W 84/18* (2009.01)
*H04L 5/00* (2006.01)
H04W 88/08 (2009.01)
H04W 52/50 (2009.01)
H04W 28/18 (2009.01)
H04W 52/36 (2009.01)

(52) U.S. Cl.
CPC ....... *H04W 72/0446* (2013.01); *H04W 84/18* (2013.01); *H04W 28/18* (2013.01); *H04W 52/36* (2013.01); *H04W 52/50* (2013.01); *H04W 88/08* (2013.01)

(58) Field of Classification Search
CPC ..... H04W 28/18; H04W 52/36; H04W 52/50; H04W 84/18
USPC ......................................................... 370/329
See application file for complete search history.

(56) References Cited

FOREIGN PATENT DOCUMENTS

| CN | 102811496 A | 12/2012 | |
|---|---|---|---|
| EP | 2398294 A1 * | 12/2011 | |
| EP | 2398294 A2 * | 12/2011 | ............ H04W 74/08 |
| WO | 2007142492 A2 | 12/2007 | |
| WO | 2010124228 A2 | 10/2010 | |
| WO | 2011084033 A2 | 7/2011 | |
| WO | 2012155234 A1 | 11/2012 | |

* cited by examiner

METHOD AND DEVICE FOR SENDING AND RECEIVING RANDOM ACCESS SEQUENCE

TECHNICAL FIELD

The embodiments of the disclosure relate to the field of communication, and in particular to a method and device for sending and receiving a random access sequence.

BACKGROUND

Machine Type Communication (MTC) User Equipment (UE), also called Machine to Machine (M2M) user communication equipment, is a main application form of the Internet of things at the present stage. Low power consumption and low cost are important guarantees to its large-scale application. M2M equipments deployed on the market at present are mainly based on a Global System of Mobile Communication (GSM). In recent years, due to high spectral efficiency of Long Term Evolution/Long Term Evolution-Advanced (LTE/LTE-A), more and more mobile operators select LTE/LTE-A as a direction of evolution of a broadband wireless communication system in the future. Various LTE/LTE-A-based M2M data services will get more attractive. An M2M service may actually be switched from a GSM to an LTE system only after the cost of LTE-M2M equipment may be lower than that of GSM-based MTC UE.

At present, alternative methods for reducing the cost of MTC UE mainly include reduction of receiving antennae of the UE, reduction of a base-band processing bandwidth of the UE, reduction of a peak rate supported by the UE, adoption of a half-duplex mode and the like. However, reduction in the cost means the degradation of performance. It is not allowed to lower a cell coverage requirement of an LTE/LTE-A system, so it is necessary for MTC UE adopting a low-cost configuration to adopt some measures to meet a coverage performance requirement of conventional LTE UE. In addition, the MTC UE may be located in a basement, a wall corner and the like, a scenario where the MTC UE is located is severer than that of ordinary LTE UE. A part of MTC UE needs more performance improvement to compensate coverage reduction caused by penetration loss, so it is necessary to enhance uplink and downlink coverage of a part of MTC UE for the scenario. How to ensure the access quality of a user is the first problem which needs to be considered, so it is necessary to enhance a design of a Physical Random Access Channel (PRACH) of the LTE/LTE-A system to ensure that the MTC UE may normally access the system.

For the problem that an access requirement cannot be met by a random access sequence processing method in a related art, there is yet no effective solution.

SUMMARY

For the problem that an access requirement cannot be met by a random access sequence processing method in the related art, the embodiments of the disclosure provide a method and device for sending and receiving a random access sequence, so as to at least solve the problem.

According to one aspect of the embodiments of the disclosure, a method for sending a random access sequence is provided, including: determining one or more preset random access resources forming a PRACH; and sending a first random access sequence on the one or more preset random access resources.

Preferably, each of the one or more preset random access resources includes one or more subcarriers on the frequency domain, and the subcarriers included in different preset random access resources on the frequency domain are: the same subcarriers, different subcarriers or partially the same subcarriers.

Preferably, each of the one or more preset random access resources includes one or more resource segments.

Preferably, a length of each resource segment on the time domain is $M_{frame}^{Segment}$ frames or $M_{subframe}^{Segment}$ subframes.

Preferably, a value of $M_{frame}^{Segment}$ or $M_{subframe}^{Segment}$ is preset by a system or notified to UE by a base station.

Preferably, each of the one or more resource segments includes $K_{Unit}^{Segment}$ sending units of a random access sequence.

Preferably, a value of $K_{Unit}^{Segment}$ is preset by the system or notified to the UE by the base station.

Preferably, each sending unit occupies one or more subframes on the time domain, and occupies one or more subcarriers on the frequency domain.

Preferably, a time-domain location is allocated to multiple sending units, wherein the multiple sending units are distinguished by different frequency-domain locations.

Preferably, each of the one or more preset random access resources includes one or more resource segments, and the step of sending the first random access sequence on the one or more preset random access resources includes:

sending the first random access sequence on $K_{Segment}$ resource segments of each preset random access resource, wherein $K_{Segment}$ is smaller than or equal to N, and N is the number of the resource segments included in each preset random access resource.

Preferably, after the step of sending the first random access sequence on the one or more preset random access resources, the method further includes:

judging whether a random access response corresponding to the first random access sequence is detected within a first time interval or not, wherein the first time interval is a time interval of which a time length is TRAR after sending time of the first random access sequence, and starting time and duration information of $T_{RAR}$ are configured by the system or notified to the UE by the base station; when the random access response corresponding to the first random access sequence is detected within the first time interval, performing random access according to the random access response; when the random access response corresponding to the first random access sequence is not detected within the first time interval, judging whether there are unused resource segments or not in the preset random access resources for sending the first random access sequence, sending the first random access sequence on the unused resource segments when there are unused resource segments in the preset random access resources and the unused resource segments can meet a sending requirement of the first random access sequence, and when there are not unused resource segments in the preset random access resources, resending the first random access sequence on preset random access resources after the preset random access resources for sending the first random access sequence; and when the preset time interval is determined to be after a time bucket where time-domain resources corresponding to the preset random access resources for sending the first random access sequence are located and the random access response corresponding to the first random access sequence is not detected within the first time interval, resending the first random access sequence on the preset random access resources after the preset random access resources for sending the first random access sequence.

Preferably, each of the one or more preset random access resources includes $K_{Unit}$ sending units of a random access sequence, wherein $K_{Unit}$ is a positive integer more than or equal to 1.

Preferably, one or more sending units are allocated to each subframe of each preset random access resource.

Preferably, each of the one or more preset random access resources includes $K_{Unit}$ sending units of a random access sequence, and the step of sending the first random access sequence on the one or more preset random access resources includes: selecting one preset random access resource from the one or more preset random access resources; and sending the first random access sequence on the selected preset random access resource.

Preferably, the random access resource is selected from a random access resource set in one of manners as follows: the number of sending units of the selected preset random access resource is the same as a first number, the first number is the same as the number of the sending units corresponding to the first random access sequence; the preset random access resources of which the numbers of the sending units of a random access sequence are more than or equal to the first number are selected from the preset random access resource set to form a set to be selected; the preset random access resource is selected from the set to be selected in one of manners as follows: the preset random access resource of which the number of the sending units of a random access sequence is the smallest is selected from the set to be selected; any one preset random access resource meeting a preset condition is selected from the set to be selected; and the preset random access resource is randomly selected from the set to be selected.

Preferably, after the step of sending the first random access sequence on the one or more preset random access resources, the method further includes: when the first time interval is determined to be after the preset random access resources for sending the first random access sequence and the random access response corresponding to the first random access sequence is not detected within the first time interval, the first time interval being the time interval of which the time length is $T_{RAR}$ after the sending time of the first random access sequence, the starting time and duration information of $T_{RAR}$ are configured by the system or notified to the UE by the base station, sending a fourth random access sequence on the preset random access resources after the preset random access resources for sending the first random access sequence.

Preferably, the fourth random access sequence is one of: the first random access sequence; a sequence of which a sequence length is greater than that of the first random access sequence; and a sequence of which the repetitive structure number is larger than the repetitive structure number of the first random access sequence.

Preferably, the first random access sequence includes one of: a second random access sequence preset by the system or notified to the UE by the base station; and a third random access sequence obtained by extension of the second random access sequence.

Preferably, the third random access sequence includes one of: a sequence obtained by repeating the second random access sequence for N times; and a sequence obtained by selecting N random access sequences according to the second random access sequence and combining the N random access sequences, wherein N is a positive integer more than or equal to 1.

Preferably, when each of the one or more preset random access resources includes $K_{Unit}$ sending units of a random access sequence, N is smaller than or equal to $K_{Unit}$.

Preferably, the N selected random access sequences include the same sequences. Preferably, when the third random access sequence is the sequence obtained by repeating the second random access sequence for N times, an index of the third random access sequence is in a mapping relationship with N.

Preferably, a length $T_{E\_PRACH}$ of each preset random access resource on the time domain is preset by the system or notified to the UE by the base station; and a starting location $T_{E\_PRACH\_Start}$ of each preset random access resource on the time domain is preset by the system or notified to the UE by the base station.

Preferably, $T_{E\_PRACH}$ is $M_{frame}$ frames or $M_{subframe}$ subframes, wherein values of $M_{frame}$ and $M_{subframe}$ are preset by the system or notified to the UE by the base station, and both $M_{frame}$ and $M_{subframe}$ are positive integers more than or equal to 1.

Preferably, $T_{E\_PRACH\_Start}$ is an index number of a frame or an index number of a subframe.

According to another aspect of the embodiments of the disclosure, a method for receiving a random access sequence is further provided, including: detecting a first random access sequence on preset random access resources; and sending a random access response corresponding to the first random access sequence.

Preferably, each of the one or more preset random access resources includes one or more subcarriers on the frequency domain, and the subcarriers included in different preset random access resources on the frequency domain are: the same subcarriers, different subcarriers or partially the same subcarriers.

Preferably, each of the one or more preset random access resources includes one or more resource segments.

Preferably, a length of each resource segment on the time domain is $M_{frame}^{Segment}$ frames or $M_{subframe}^{Segment}$ subframes.

Preferably, a value of $M_{frame}^{Segment}$ or $M_{subframe}^{Segment}$ is preset by a system or notified to UE by a base station.

Preferably, each of the one or more resource segments includes $K_{Unit}^{Segment}$ sending units of a random access sequence.

Preferably, a value of $K_{Unit}^{Segment}$ is preset by the system or notified to the UE by the base station.

Preferably, each sending unit occupies one or more subframes on the time domain, and occupies one or more subcarriers on the frequency domain.

Preferably, one or more sending units may be allocated at the same time-domain location on the frequency domain, and the time-domain location refers to subframe information occupied by the sending units.

Preferably, each of the one or more preset random access resources includes $K_{Unit}$ sending units of a random access sequence, wherein $K_{Unit}$ is a positive integer more than or equal to 1.

Preferably, one or more sending units are allocated to each subframe of the preset random access resources.

Preferably, the first random access sequence includes one of: a second random access sequence preset by the system or notified to the UE by the base station; and a third random access sequence obtained by extension of the second random access sequence.

Preferably, the third random access sequence includes one of: a sequence obtained by repeating the second random access sequence for N times; and a sequence obtained by selecting N random access sequences according to the second random access sequence and combining the N random access sequences, wherein N is a positive integer more than or equal to 1.

Preferably, when each of the one or more preset random access resources includes $K_{Unit}$ sending units of a random access sequence, N is smaller than or equal to $K_{Unit}$.

Preferably, the N selected random access sequences include the same sequences.

Preferably, when the third random access sequence is the sequence obtained by repeating the second random access sequence for N times, an index of the third random access sequence is in a mapping relationship with N.

Preferably, a length $T_{E\_PRACH}$ of each preset random access resource on the time domain is preset by the system or notified to the UE by the base station; and a starting location $T_{E\_PRACH\_Start}$ of each preset random access resource on the time domain is preset by the system or notified to the UE by the base station.

Preferably, $T_{E\_PRACH}$ is $M_{frame}$ frames or $M_{subframe}$ subframes, wherein values of $M_{frame}$ and $M_{subframe}$ are preset by the system or notified to the UE by the base station, and both $M_{frame}$ and $M_{subframe}$ are positive integers more than or equal to 1.

Preferably, $T_{E\_PRACH\_Start}$ is an index number of a frame or an index number of a subframe.

According to another aspect of the embodiments of the disclosure, a device for sending a random access sequence is provided, including: a determination component, configured to determine one or more preset random access resources forming a PRACH; and a first sending component, configured to send a first random access sequence on the one or more preset random access resources.

Preferably, each of the one or more preset random access resources includes one or more subcarriers on the frequency domain, and the subcarriers included in different preset random access resources on the frequency domain are: the same subcarriers, different subcarriers or partially the same subcarriers.

Preferably, each of the one or more preset random access resources includes one or more resource segments.

Preferably, a length of each resource segment on the time domain is $M_{frame}^{Segment}$ frames or $M_{subframe}^{Segment}$ subframes.

Preferably, a value of $M_{frame}^{Segment}$ or $M_{subframe}^{Segment}$ is preset by a system or notified to UE by a base station.

Preferably, each of the one or more resource segments includes $K_{Unit}^{Segment}$ sending units of a random access sequence.

Preferably, a value of $K_{Unit}^{Segment}$ is preset by the system or notified to the UE by the base station.

Preferably, each sending unit occupies one or more subframes on the time domain, and occupies one or more subcarriers on the frequency domain.

Preferably, a time-domain location is allocated to multiple sending units, wherein the multiple sending units are distinguished by different frequency-domain locations.

Preferably, the first sending component is configured to, when each of the one or more preset random access resources includes one or more resource segments, send the first random access sequence on $K_{Segment}$ resource segments of each preset random access resource, wherein $K_{Segment}$ is smaller than or equal to Z, and Z is the number of the resource segments included in each preset random access resource.

Preferably, the device further includes: a first judgment component, configured to judge whether a random access response corresponding to the first random access sequence is detected within a first time interval or not, wherein the first time interval is a time interval of which a time length is TRAR after sending time of the first random access sequence, and starting time and duration information of $T_{RAR}$ are configured by the system or notified to the UE by the base station; an access component, configured to, if a judgment result of the first judgment component is YES, perform random access according to the random access response; a second judgment component, configured to, if the judgment result of the first judgment component is NO, judge whether there are unused resource segments or not in the preset random access resources for sending the first random access sequence; a first processing component, configured to, when a judgment result of the second judgment component is YES and the unused resource segments can meet a sending requirement of the first random access sequence, send the first random access sequence on the unused resource segments; a second processing component, configured to, if the judgment result of the second judgment component is NO, resend the first random access sequence on preset random access resources after the preset random access resources for sending the first random access sequence; and a third processing component, configured to, when the preset time interval is determined to be after a time bucket where time-domain resources corresponding to the preset random access resources for sending the first random access sequence are located and the random access response corresponding to the first random access sequence is not detected within the first time interval, resend the first random access sequence on the preset random access resources after the preset random access resources for sending the first random access sequence.

Preferably, each of the one or more preset random access resources includes $K_{Unit}$ sending units of a random access sequence, wherein $K_{Unit}$ is a positive integer more than or equal to 1.

Preferably, one or more sending units are allocated to each subframe of each preset random access resource.

Preferably, each of the one or more preset random access resources includes $K_{Unit}$ sending units of a random access sequence, and the operation of sending the first random access sequence on the one or more preset random access resources includes: selecting one preset random access resource from the one or more preset random access resources; and sending the first random access sequence on the selected preset random access resource.

Preferably, the random access resource is selected from a random access resource set in one of manners as follows: the number of sending units of the selected preset random access resource is the same as a first number, the first number is the same as the number of the sending units corresponding to the first random access sequence; the preset random access resources of which the numbers of the sending units of a random access sequence are more than or equal to the first number are selected from the preset random access resource set to form a set to be selected; the preset random access resource is selected from the set to be selected in one of manners as follows: the preset random access resource of which the number of the sending units of a random access sequence is the smallest is selected from the set to be selected; any one preset random access resource meeting a preset condition is selected from the set to be selected; and the preset random access resource is randomly selected from the set to be selected.

Preferably, the device further includes: a fourth processing component, configured to, when the first time interval is determined to be after the preset random access resources for sending the first random access sequence and the random access response corresponding to the first random access sequence is not detected within the first time interval, the first time interval being the time interval of which the time length is $T_{RAR}$ after the sending time of the first random access sequence, the starting time and duration information of $T_{RAR}$ are configured by the system or notified to the UE by the base station, send a fourth random access sequence on the preset random access resources after the preset random access resources for sending the first random access sequence.

Preferably, the fourth random access sequence is one of: the first random access sequence; a sequence of which a sequence length is greater than that of the first random access sequence; and a sequence of which the repetitive structure number is larger than the repetitive structure number of the first random access sequence.

Preferably, the first random access sequence includes one of: a second random access sequence preset by the system or notified to the UE by the base station; and a third random access sequence obtained by extension of the second random access sequence.

Preferably, the third random access sequence includes one of: a sequence obtained by repeating the second random access sequence for N times; and a sequence obtained by selecting N random access sequences according to the second random access sequence and combining the N random access sequences, wherein N is a positive integer more than or equal to 1.

Preferably, when each of the one or more preset random access resources includes $K_{Unit}$ sending units of a random access sequence, N is smaller than or equal to $K_{Unit}$.

Preferably, the N selected random access sequences include the same sequences.

Preferably, when the third random access sequence is the sequence obtained by repeating the second random access sequence for N times, an index of the third random access sequence is in a mapping relationship with N.

Preferably, a length $T_{E\_PRACH}$ of each preset random access resource on the time domain is preset by the system or notified to the UE by the base station; and a starting location $T_{E\_PRACH\_Start}$ of each preset random access resource on the time domain is preset by the system or notified to the UE by the base station.

Preferably, $T_{E\_PRACH}$ is $M_{frame}$ frames or $M_{subframe}$ subframes, wherein values of $M_{frame}$ and $M_{subframe}$ are preset by the system or notified to the UE by the base station, and both $M_{frame}$ and $M_{subframe}$ are positive integers more than or equal to 1.

Preferably, $T_{E\_PRACH\_Start}$ is an index number of a frame or an index number of a subframe.

According to another aspect of the embodiments of the disclosure, a device for receiving a random access sequence is further provided, including: a detection component, configured to detect a first random access sequence on preset random access resources; and a second sending component, configured to send a random access response corresponding to the first random access sequence.

Preferably, each of the one or more preset random access resources includes one or more subcarriers on the frequency domain, and the subcarriers included in different preset random access resources on the frequency domain are: the same subcarriers, different subcarriers or partially the same subcarriers.

Preferably, each of the one or more preset random access resources includes one or more resource segments.

Preferably, a length of each resource segment on the time domain is $M_{frame}^{Segment}$ frames or $M_{subframe}^{Segment}$ subframes.

Preferably, a value of $M_{frame}^{Segment}$ or $M_{subframe}^{Segment}$ is preset by a system or notified to UE by a base station.

Preferably, each of the one or more resource segments includes $K_{Unit}^{Segment}$ sending units of a random access sequence.

Preferably, a value of $K_{Unit}^{Segment}$ is preset by the system or notified to the UE by the base station.

Preferably, each sending unit occupies one or more subframes on the time domain, and occupies one or more subcarriers on the frequency domain.

Preferably, a time-domain location is allocated to multiple sending units, wherein the multiple sending units are distinguished by different frequency-domain locations.

Preferably, each preset random access resource includes $K_{Unit}$ sending units of a random access sequence, wherein $K_{Unit}$ is a positive integer more than or equal to 1.

Preferably, one or more sending units are allocated to each subframe of the preset random access resources.

Preferably, the first random access sequence includes one of: a second random access sequence preset by the system or notified to the UE by the base station; and a third random access sequence obtained by extension of the second random access sequence.

Preferably, the third random access sequence includes one of: a sequence obtained by repeating the second random access sequence for N times; and a sequence obtained by selecting N random access sequences according to the second random access sequence and combining the N random access sequences, wherein N is a positive integer more than or equal to 1.

Preferably, when each of the one or more preset random access resources includes $K_{Unit}$ sending units of a random access sequence, N is smaller than or equal to $K_{Unit}$.

Preferably, the N selected random access sequences include the same sequences.

Preferably, when the third random access sequence is the sequence obtained by repeating the second random access sequence for N times, an index of the third random access sequence is in a mapping relationship with N.

Preferably, a length $T_{E\_PRACH}$ of each preset random access resource on the time domain is preset by the system or notified to the UE by the base station; and a starting location $T_{E\_PRACH\_Start}$ of each preset random access resource on the time domain is preset by the system or notified to the UE by the base station.

Preferably, $T_{E\_PRACH}$ is $M_{frame}$ frames or $M_{subframe}$ subframes, wherein values of $M_{frame}$ and $M_{subframe}$ are preset by the system or notified to the UE by the base station, and both $M_{frame}$ and $M_{subframe}$ are positive integers more than or equal to 1.

Preferably, $T_{E\_PRACH\_Start}$ is an index number of a frame or an index number of a subframe.

By the embodiments of the disclosure, a random access signal is sent and received on the one or more preset random access resources forming the PRACH, so that the problem that the access requirement cannot be met by the random access sequence processing method in the related art is solved, and the effect of improving random access efficiency and accuracy is further achieved.

BRIEF DESCRIPTION OF THE DRAWINGS

The drawings are described here to provide further understanding of the embodiments of the disclosure, and form a part of the disclosure. The schematic embodiments and description of the disclosure are adopted to explain the disclosure, and do not form improper limits to the disclosure. In the drawings.

DETAILED DESCRIPTION OF THE EMBODIMENTS

The disclosure is described below with reference to the drawings and the embodiments in detail. It is important to note that the embodiments of the disclosure and the characteristics in the embodiments can be combined under the condition of no conflicts.

Figure 1:
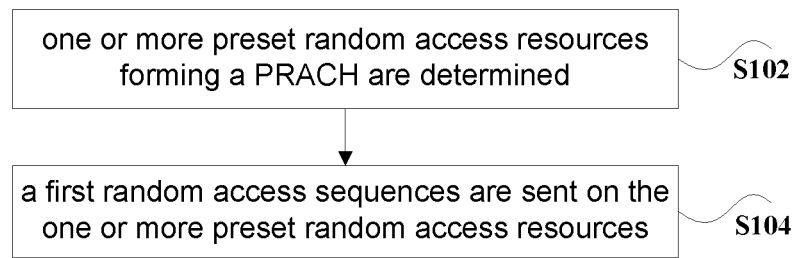
FIG. 1 is a flowchart of a method for sending a random access sequence according to an embodiment of the disclosure.

The embodiment provides a method for sending a random access sequence, FIG. 1 is a flowchart of a method for sending a random access sequence according to an embodiment of the disclosure, and as shown in FIG. 1, the method includes the following Step 102 and Step 104.

Step 102: one or more preset random access resources forming a PRACH are determined Step 104: a first random access sequences are sent on the one or more preset random access resources.

Preferably, each of the one or more preset random access resources includes one or more subcarriers on the frequency domain, and the subcarriers included in different preset random access resources on the frequency domain are: the same subcarriers, different subcarriers or partially the same subcarriers.

Preferably, each of the one or more preset random access resources includes one or more resource segments.

Preferably, a length of each resource segment on the time domain is $M_{frame}^{Segment}$ frames or $M_{subframe}^{Segment}$ subframes.

Preferably, a value of $M_{frame}^{Segment}$ or $M_{subframe}^{Segment}$ is preset by a system or notified to UE by a base station.

Preferably, each of the one or more resource segments includes $K_{Unit}^{Segment}$ sending units of a random access sequence.

Preferably, a value of $K_{Unit}^{Segment}$ is preset by the system or notified to the UE by the base station.

Preferably, each sending unit occupies one or more subframes on the time domain, and occupies one or more subcarriers on the frequency domain.

Preferably, a time-domain location is allocated to multiple sending units, wherein the multiple sending units are distinguished by different frequency-domain locations.

Preferably, each of the one or more preset random access resources includes one or more resource segments, and the first random access sequence is sent on the one or more preset random access resources includes: the first random access sequence is sent on $K_{Segment}$ resource segments of each preset random access resource, wherein $K_{Segment}$ is smaller than or equal to N, and N is the number of the resource segments included in each preset random access resource.

Preferably, after the first random access sequence is sent on the one or more preset random access resources, the method further includes:

It is judged that whether a random access response corresponding to the first random access sequence is detected within a first time interval or not, wherein the first time interval is a time interval of which a time length is TRAR after sending time of the first random access sequence, and starting time and duration information of $T_{RAR}$ are configured by the system or notified to the UE by the base station; when the random access response corresponding to the first random access sequence is detected within the first time interval, random access is performed according to the random access response; when the random access response corresponding to the first random access sequence is not detected within the first time interval, it is judged that whether there are unused resource segments or not in the preset random access resources for sending the first random access sequence, the first random access sequence is sending on the unused resource segments when there are unused resource segments in the preset random access resources and the unused resource segments can meet a sending requirement of the first random access sequence, and when there are not unused resource segments in the preset random access resources, resending the first random access sequence on preset random access resources after the preset random access resources for sending the first random access sequence; and when the preset time interval is determined to be after a time bucket where time-domain resources corresponding to the preset random access resources for sending the first random access sequence are located and the random access response corresponding to the first random access sequence is not detected within the first time interval, the first random access sequence is resent on the preset random access resources after the preset random access resources for sending the first random access sequence.

Preferably, each of the one or more preset random access resources includes $K_{Unit}$ sending units of a random access sequence, wherein $K_{Unit}$ is a positive integer more than or equal to 1.

Preferably, one or more sending units are allocated to each subframe of each preset random access resource.

Preferably, each of the one or more preset random access resources includes $K_{Unit}$ sending units of a random access sequence, and the step of sending the first random access sequence on the one or more preset random access resources includes:

one preset random access resource is selected from the one or more preset random access resources; and the first random access sequence is sent on the selected preset random access resource.

Preferably, the random access resource is selected from a random access resource set in one of manners as follows:

the number of sending units of the selected preset random access resource is the same as a first number, the first number is the same as the number of the sending units corresponding to the first random access sequence;

the preset random access resources of which the numbers of the sending units of a random access sequence are more than or equal to the first number are selected from the preset random access resource set to form a set to be selected; the preset random access resource is selected from the set to be selected in one of manners as follows: the preset random access resource of which the number of the sending units of a random access sequence is the smallest is selected from the set to be selected; any one preset random access resource meeting a preset condition is selected from the set to be selected; and the preset random access resource is randomly selected from the set to be selected.

Preferably, after the step of sending the first random access sequence on the one or more preset random access resources, the method further includes:

when the first time interval is determined to be after the preset random access resources for sending the first random access sequence and the random access response corresponding to the first random access sequence is not detected within the first time interval, the first time interval being the time interval of which the time length is $T_{RAR}$ after the sending time of the first random access sequence, the starting time and duration information of $T_{RAR}$ are configured by the system or notified to the UE by the base station, sending a fourth random access sequence on the preset random access resources after the preset random access resources for sending the first random access sequence.

Preferably, the fourth random access sequence is one of:

the first random access sequence;

a sequence of which a sequence length is greater than that of the first random access sequence; and a sequence of which the repetitive structure number is larger than the repetitive structure number of the first random access sequence.

Preferably, the first random access sequence includes one of:

a second random access sequence preset by the system or notified to the UE by the base station; and a third random access sequence obtained by extension of the second random access sequence.

Preferably, the third random access sequence includes one of: a sequence obtained by repeating the second random access sequence for N times; and a sequence obtained by selecting N random access sequences according to the second random access sequence and combining the N random access sequences, wherein N is a positive integer more than or equal to 1.

Preferably, when each of the one or more preset random access resources includes $K_{Unit}$ sending units of a random access sequence, N is smaller than or equal to $K_{Unit}$.

Preferably, the N selected random access sequences include the same sequences.

Preferably, when the third random access sequence is the sequence obtained by repeating the second random access sequence for N times, an index of the third random access sequence is in a mapping relationship with N.

Preferably, a length $T_{E\_PRACH}$ of each preset random access resource on the time domain is preset by the system or notified to the UE by the base station; and a starting location $T_{E\_PRACH\_Start}$ of each preset random access resource on the time domain is preset by the system or notified to the UE by the base station.

Preferably, $T_{E\_PRACH}$ is $M_{frame}$ frames or $M_{subframe}$ subframes, wherein values of $M_{frame}$ and $M_{subframe}$ are preset by the system or notified to the UE by the base station, and both $M_{frame}$ and $M_{subframe}$ are positive integers more than or equal to 1.

Preferably, $T_{E\_PRACH\_Start}$ is an index number of a frame or an index number of a subframe.

Figure 2:
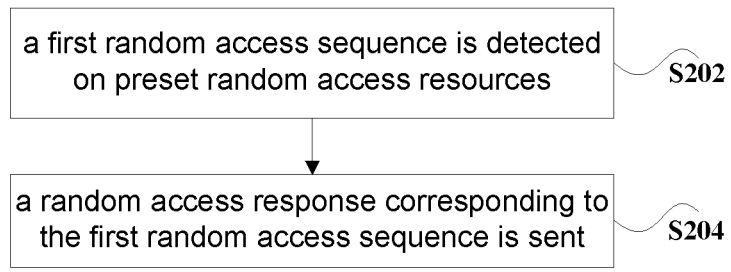
FIG. 2 is a flowchart of a method for receiving a random access sequence according to an embodiment of the disclosure.

The embodiment provides a method for receiving a random access sequence, FIG. 2 is a flowchart of a method for receiving a random access sequence according to an embodiment of the disclosure, and as shown in FIG. 2, the method includes the following Step 202 and Step 204.

Step 202: a first random access sequence is detected on preset random access resources.

Step 204: a random access response corresponding to the first random access sequence is sent.

Preferably, each of the one or more preset random access resources includes one or more subcarriers on the frequency domain, and the subcarriers included in different preset random access resources on the frequency domain are: the same subcarriers, different subcarriers or partially the same subcarriers.

Preferably, each of the one or more preset random access resources includes one or more resource segments.

Preferably, a length of each resource segment on the time domain is $M_{frame}^{Segment}$ frames or $M_{subframe}^{Segment}$ subframes.

Preferably, a value of $M_{frame}^{Segment}$ $M_{subframe}^{Segment}$ is preset by a system or notified to UE by a base station.

Preferably, each of the one or more resource segments includes $K_{Unit}^{Segment}$ sending units of a random access sequence.

Preferably, a value of $K_{Unit}^{Segment}$ is preset by the system or notified to the UE by the base station.

Preferably, each sending unit occupies one or more subframes on the time domain, and occupies one or more subcarriers on the frequency domain.

Preferably, one or more sending units may be allocated at the same time-domain location on the frequency domain, and the time-domain location refers to subframe information occupied by the sending units.

Preferably, each of the one or more preset random access resources includes $K_{Unit}$ sending units of a random access sequence, wherein $K_{Unit}$ is a positive integer more than or equal to 1.

Preferably, one or more sending units are allocated to each subframe of the preset random access resources.

Preferably, the first random access sequence includes one of: a second random access sequence preset by the system or notified to the UE by the base station; and a third random access sequence obtained by extension of the second random access sequence.

Preferably, the third random access sequence includes one of: a sequence obtained by repeating the second random access sequence for N times; and a sequence obtained by selecting N random access sequences according to the second random access sequence and combining the N random access sequences, wherein N is a positive integer more than or equal to 1.

Preferably, when each of the one or more preset random access resources includes $K_{Unit}$ sending units of a random access sequence, N is smaller than or equal to $K_{Unit}$.

Preferably, the N selected random access sequences include the same sequences.

Preferably, when the third random access sequence is the sequence obtained by repeating the second random access sequence for N times, an index of the third random access sequence is in a mapping relationship with N.

Preferably, a length $T_{E\_PRACH}$ of each preset random access resource on the time domain is preset by the system or notified to the UE by the base station; and a starting location $T_{E\_PRACH\_Start}$ of each preset random access resource on the time domain is preset by the system or notified to the UE by the base station.

Preferably, $T_{E\_PRACH}$ is $M_{frame}$ frames or $M_{subframe}$ subframes, wherein values of $M_{frame}$ and $M_{subframe}$ are preset by the system or notified to the UE by the base station, and both $M_{frame}$ and $M_{subframe}$ are positive integers more than or equal to 1.

Preferably, $T_{E\_PRACH\_Start}$ is an index number of a frame or an index number of a subframe.

It is important to note that the steps shown in the flowcharts in the drawings can be executed in a computer system, such as a group of computers, capable of executing an instruction, and moreover, although logic sequences are shown in the flowcharts, the shown or described steps may be executed in sequence different from the logic sequences under certain conditions.

In another embodiment, software for sending a random access sequence is further provided, which is configured to execute the technical solutions described in the embodiment and preferred embodiments.

In another embodiment, a storage medium is further provided, in which the software for sending the random access sequence is stored, the storage medium including, but not limited to: a compact disc, a floppy disk, a hard disk, an erasable memory and the like.

The embodiments of the disclosure further provide a device for sending a random access sequence. The device for sending the random access sequence may be configured to implement the method for sending the random access sequence and preferred implementation modes, that what has been described will not be repeated, and components involved in the device for sending the random access sequence are described below. For example, a term "component", used below, is a combination of software and/or hardware for realizing preset functions. A system and method described in the following embodiment are preferably implemented by software, but the implementation of the system and the method with hardware or the combination of software and hardware is also possible and conceived.

Figure 3:
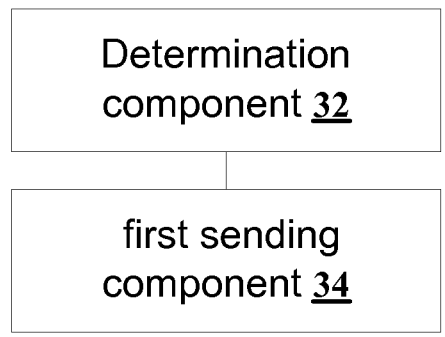
FIG. 3 is a structure diagram of a device for sending a random access sequence according to an embodiment of the disclosure.

FIG. 3 is a structure diagram of a device for sending a random access sequence according to an embodiment of the disclosure, and as shown in FIG. 3, the device includes: a determination component 32 and a first sending component 34. The structure is described below in detail.

The determination component 32 is configured to determine one or more preset random access resources forming a PRACH; and the first sending component 34 is connected to the determination component 32, and is configured to send a first random access sequence on the one or more preset random access resources determined by the determination component 32.

Figure 4:
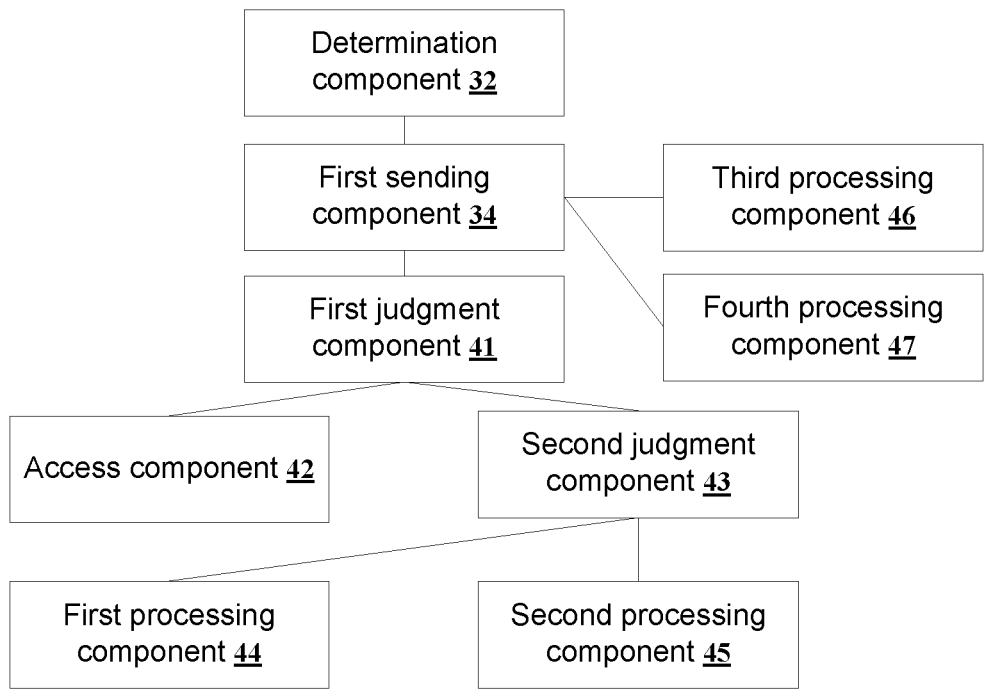
FIG. 4 is a preferred structure diagram of a device for sending a random access sequence according to an embodiment of the disclosure.

FIG. 4 is a preferred structure diagram of a device for sending a random access sequence according to an embodiment of the disclosure, and as shown in FIG. 4, the device further includes: a first judgment component 41, an access component 42, a second judgment component 43, a first processing component 44, a second processing component 45, a third processing component 46 and a fourth processing component 47. The structure is described below in detail.

Preferably, the device further includes:

the first judgment component 41, configured to judge whether a random access response corresponding to the first random access sequence is detected within a first time interval or not, wherein the first time interval is a time interval of which a time length is TRAR after sending time of the first random access sequence, and starting time and duration information of $T_{RAR}$ are configured by a system or notified to UE by a base station;

the access component 42, connected to the first judgment component 41 and configured to, when a judgment result of the first judgment component 41 is YES, perform random access according to the random access response;

the second judgment component 43, connected to the first judgment component 41 and configured to, when the judgment result of the first judgment component 41 is NO, judge whether there are unused resource segments or not in the preset random access resources for sending the first random access sequence;

the first processing component 44, connected to the second judgment component 43 and configured to, when a judgment result of the second judgment component 43 is YES and the unused resource segments can meet a sending requirement of the first random access sequence, send the first random access sequence on the unused resource segments;

the second processing component 45, connected to the second judgment component 43 and configured to, if the judgment result of the second judgment component 43 is NO, resend the first random access sequence on preset random access resources after the preset random access resources for sending the first random access sequence; and the third processing component 46, configured to, when the preset time interval is determined to be after a time bucket where time-domain resources corresponding to the preset random access resources for sending the first random access sequence are located and the random access response corresponding to the first random access sequence is not detected within the first time interval, resend the first random access sequence on the preset random access resources after the preset random access resources for sending the first random access sequence.

Preferably, the device further includes: a fourth processing component 47, configured to, when the first time interval is determined to be after the preset random access resources for sending the first random access sequence and the random access response corresponding to the first random access sequence is not detected within the first time interval, the first time interval being the time interval of which the time length is $T_{RAR}$ after the sending time of the first random access sequence, the starting time and duration information of $T_{RAR}$ are configured by the system or notified to the UE by the base station, send a fourth random access sequence on the preset random access resources after the preset random access resources for sending the first random access sequence.

Preferably, each of the one or more preset random access resources includes one or more subcarriers on the frequency domain, and the subcarriers included in different preset random access resources on the frequency domain are: the same subcarriers, different subcarriers or partially the same subcarriers.

Preferably, each of the one or more preset random access resources includes one or more resource segments.

Preferably, a length of each resource segment on the time domain is $M_{frame}^{Segment}$ frames or $M_{subframe}^{Segment}$ subframes.

Preferably, a value of $M_{frame}^{Segment}$ or $M_{subframe}^{Segment}$ is preset by the system or notified to the UE by the base station.

Preferably, each of the one or more resource segments includes $K_{Unit}^{Segment}$ sending units of a random access sequence.

Preferably, a value of $K_{Unit}^{Segment}$ is preset by the system or notified to the UE by the base station.

Preferably, each sending unit occupies one or more subframes on the time domain, and occupies one or more subcarriers on the frequency domain.

Preferably, a time-domain location is allocated to multiple sending units, wherein the multiple sending units are distinguished by different frequency-domain locations.

Preferably, the first sending component is configured to, when each of the one or more preset random access resources includes one or more resource segments, send the first random access sequence on $K_{Segment}$ resource segments of each preset random access resource, wherein $K_{Segment}$ is smaller than or equal to Z, and Z is the number of the resource segments included in each preset random access resource.

Preferably, each of the one or more preset random access resources includes $K_{Unit}$ sending units of a random access sequence, wherein $K_{Unit}$ is a positive integer more than or equal to 1.

Preferably, one or more sending units are allocated to each subframe of each preset random access resource.

Preferably, each of the one or more preset random access resources includes $K_{Unit}$ sending units of a random access sequence, and the operation of sending the first random access sequence on the one or more preset random access resources includes:

one preset random access resource is selected from the one or more preset random access resources; and
the first random access sequence is sent on the selected preset random access resource.

Preferably, the random access resource is selected from a random access resource set in one of manners as follows:

the number of sending units of the selected preset random access resource is the same as a first number, the first number is the same as the number of the sending units corresponding to the first random access sequence;

the preset random access resources of which the numbers of the sending units of a random access sequence are more than or equal to the first number are selected from the preset random access resource set to form a set to be selected; the preset random access resource is selected from the set to be selected in one of manners as follows: the preset random access resource of which the number of the sending units of the random access sequence is the smallest is selected from the set to be selected; any one preset random access resource meeting a preset condition is selected from the set to be selected; and the preset random access resource is randomly selected from the set to be selected.

Preferably, the fourth random access sequence is one of:
the first random access sequence;

a sequence of which a sequence length is greater than that of the first random access sequence; and a sequence of which the repetitive structure number is larger than the repetitive structure number of the first random access sequence.

Preferably, the first random access sequence includes one of:

a second random access sequence preset by the system or notified to the UE by the base station; and a third random access sequence obtained by extension of the second random access sequence.

Preferably, the third random access sequence includes one of:

a sequence obtained by repeating the second random access sequence for N times; and a sequence obtained by selecting N random access sequences according to the second random access sequence and combining the N random access sequences, wherein N is a positive integer more than or equal to 1.

Preferably, when each of the one or more preset random access resources includes $K_{Unit}$ sending units of a random access sequence, N is smaller than or equal to $K_{Unit}$.

Preferably, the N selected random access sequences include the same sequences.

Preferably, when the third random access sequence is the sequence obtained by repeating the second random access sequence for N times, an index of the third random access sequence is in a mapping relationship with N.

Preferably, a length $T_{E\_PRACH}$ of each preset random access resource on the time domain is preset by the system or notified to the UE by the base station; and a starting location $T_{E\_PRACH\_Start}$ of each preset random access resource on the time domain is preset by the system or notified to the UE by the base station.

Preferably, $T_{E\_PRACH}$ is $M_{frame}$ frames or $M_{subframe}$ subframes, wherein values of $M_{frame}$ and $M_{subframe}$ are preset by the system or notified to the UE by the base station, and both $M_{frame}$ and $M_{subframe}$ are positive integers more than or equal to 1.

Preferably, $T_{E\_PRACH\_Start}$ is an index number of a frame or an index number of a subframe.

In another embodiment, software for receiving a random access sequence is further provided, which is configured to execute the technical solutions described in the embodiment and the preferred embodiments.

In another embodiment, a storage medium is further provided, in which the software for receiving the random access sequence is stored, the storage medium including, but not limited to: a compact disc, a floppy disk, a hard disk, an erasable memory and the like.

The embodiments of the disclosure further provide a device for receiving a random access sequence. The device for receiving the random access sequence may be configured to implement the method for receiving the random access sequence and preferred implementation modes, that what has been described will not be repeated, and components involved in the receiving device for the random access sequence are described below. For example, a term "component", used below, is a combination of software and/or hardware for realizing preset functions. A system and method described in the following embodiment are preferably implemented by software, but the implementation of the system and the method with hardware or the combination of software and hardware is also possible and conceived.

Figure 5:
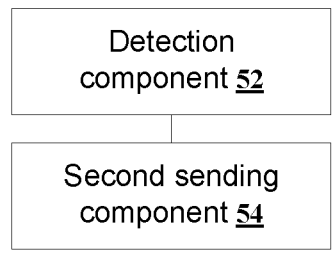
FIG. 5 is a structure diagram of a device for receiving a random access sequence according to an embodiment of the disclosure.

FIG. 5 is a structure diagram of a device for receiving a random access sequence according to an embodiment of the disclosure, and as shown in FIG. 5, the device includes: a detection component 52 and a second sending component 54. The structure is described below in detail.

The detection component 52 is configured to detect a first random access sequence on preset random access resources; and the second sending component 54 is connected to the detection component 52, and is configured to send a random access response corresponding to the first random access sequence detected by the detection component 52.

Preferably, each of the one or more preset random access resources includes one or more subcarriers on the frequency domain, and the subcarriers included in different preset random access resources on the frequency domain are: the same subcarriers, different subcarriers or partially the same subcarriers.

Preferably, each of the one or more preset random access resources includes one or more resource segments.

Preferably, a length of each resource segment on the time domain is $M_{frame}^{Segment}$ frames or $M_{subframe}^{Segment}$ subframes.

Preferably, a value of $M_{frame}^{Segment}$ or $M_{subframe}^{Segment}$ is preset by a system or notified to UE by a base station.

Preferably, each of the one or more resource segments includes $K_{Unit}^{Segment}$ sending units of a random access sequence.

Preferably, a value of $K_{Unit}^{Segment}$ is preset by the system or notified to the UE by the base station.

Preferably, each sending unit occupies one or more subframes on the time domain, and occupies one or more subcarriers on the frequency domain.

Preferably, a time-domain location is allocated to multiple sending units, wherein the multiple sending units are distinguished by different frequency-domain locations.

Preferably, each preset random access resource includes $K_{Unit}$ sending units of a random access sequence, wherein $K_{Unit}$ is a positive integer more than or equal to 1.

Preferably, one or more sending units are allocated to each subframe of the preset random access resources.

Preferably, the first random access sequence includes one of:

a second random access sequence preset by the system or notified to the UE by the base station; and a third random access sequence obtained by extension of the second random access sequence.

Preferably, the third random access sequence includes one of:

a sequence obtained by repeating the second random access sequence for N times; and a sequence obtained by selecting N random access sequences according to the second random access sequence and combining the N random access sequences, wherein N is a positive integer more than or equal to 1.

Preferably, when each of the one or more preset random access resources includes $K_{Unit}$ sending units of a random access sequence, N is smaller than or equal to $K_{Unit}$.

Preferably, the N selected random access sequences include the same sequences.

Preferably, when the third random access sequence is the sequence obtained by repeating the second random access sequence for N times, an index of the third random access sequence is in a mapping relationship with N.

Preferably, a length $T_{E\_PRACH}$ of each preset random access resource on the time domain is preset by the system or notified to the UE by the base station; and a starting location $T_{E\_PRACH\_Start}$ of each preset random access resource on the time domain is preset by the system or notified to the UE by the base station.

Preferably, $T_{E\_PRACH}$ is $M_{frame}$ frames or $M_{subframe}$ subframes, wherein values of $M_{frame}$ and $M_{subframe}$ are preset by the system or notified to the UE by the base station, and both $M_{frame}$ and $M_{subframe}$ are positive integers more than or equal to 1.

Preferably, $T_{E\_PRACH\_Start}$ is an index number of a frame or an index number of a subframe.

Description is given below with reference to preferred embodiments, and the following preferred embodiments combine the embodiment and the preferred implementation modes.

Preferred Embodiment 1

The preferred embodiment provides a method for sending and receiving a random access sequence, so as to improve random access performance of MTC UE.

The preferred embodiment is described below with two solutions.

Solution 1:

(1) A PRACH in the preferred embodiment consists of one or more ERARs, and UE sends an enhanced random access sequence on the PRACH, wherein each ERAR includes one or more subcarriers on the frequency domain.

Preferably, different ERARs may include the same subcarriers or different subcarriers or partially the same subcarriers on the frequency domain, wherein a length $T_{E-PRACH}$ of each ERAR on the time domain is a default configuration of a standard or sent to the UE through signalling by a base station.

Preferably, $T_{E-PRACH}$ may be $M_{frame}$ frames or $M_{subframe}$ subframes, and a value of $M_{frame}$ or $M_{subframe}$ may be a default configuration of a standard or sent to the UE through signalling by the base station, wherein starting time $T_{E\_PRACH\_Start}$ of each ERAR on the time domain is a default configuration of a standard or sent to the UE through signalling by the base station.

Preferably, $T_{E\_PRACH\_Start}$ may be an index number of a frame or an index number of subframe.

Preferably, each ERAR includes one or more resource segments, and a length $T_{Segment}$ of each resource segment is a default configuration of a standard or sent to the UE through signalling by the base station.

Preferably, $T_{Segment}$ may be $M_{frame}^{Segment}$ frames or $M_{subframe}^{Segment}$ subframes; and a value of $M_{frame}^{Segment}$ or $M_{subframe}^{Segment}$ is a default configuration of a standard or sent to the UE through signalling by the base station.

Preferably, $T_{Segment}$ corresponding to different segments may be the same or different.

Preferably, each segment includes $K_{Unit}^{Segment}$ sending units of a random access sequence; and a value of $K_{Unit}^{Segment}$ is a default configuration of a standard or sent to the UE through signalling by the base station.

Preferably, each sending unit occupies one or more subframes on the time domain, and occupies one or more subcarriers on the frequency domain.

Preferably, indexes of the subcarriers occupied by the sending units at different time-domain locations on the frequency domain may be the same or different.

Preferably, one or more sending units may be allocated to the same time-domain location on the frequency domain.

Preferably, the time-domain locations refer to subframe information occupied by the sending units.

Preferably, the enhanced random access sequence refers to one of:

a random access sequence which is a default configuration of a standard or notified to the UE through signalling by the base station; and a repetitive structure of the random access sequence which is the default configuration of a standard or notified to the UE through signalling by the base station.

Preferably, the repetitive structure of the random access sequence includes one of:

a structure obtained by directly repeating the random access sequence for N times, N being a positive integer more than or equal to 1; and a structure obtained by selecting N random access sequences according to a preset principle, wherein the preset principle is a default configuration of a standard or sent to the UE through signalling by the base station; the N random access sequences may include the same sequences; and N is a positive integer more than or equal to 1.

Preferably, N is smaller than or equal to the total number of the sending units of a random access sequence included in the ERARs.

Preferably, the repetitive structure number $R_{Segment}$ of the random access sequence which can be sent in the segments is a default configuration of a standard or sent to the UE through signalling by the base station. $R_{Segment}$ includes one or more values.

Preferably, values of $R_{Segment}$ in different segments may be the same or different.

(2) The UE sends the enhanced random access sequence on the ERARs.

Preferably, the UE sends the enhanced random access sequence on $K_{Segment}$ segments in the ERARs, wherein $K_{Segment}$ is a default configuration of a standard or notified to the UE through signalling by the base station or determined by the UE.

(3) The base station detects the enhanced random access sequence sent by the UE on the ERARs, and sends a random access response message to the UE.

(4) The UE detects the random access response message sent by the base station within the next time bucket of which a length is $T_{RAR}$, wherein starting time and duration information of $T_{RAR}$ are default configuration of a standards or sent to the UE through signalling by the base station.

In the first solution, the following two processing flows are involved:

Flow 1: if the UE detects the random access response message sent by the base station within the time bucket of which the length is $T_{RAR}$, a subsequent random access flow is finished according to the random access response message; if the UE does not detect the random access response message sent by the base station within the time bucket of which the length is $T_{RAR}$ and there are segment resources in the selected ERARs, the UE continues sending the enhanced random access sequence at the next segment time; and if the UE does not detect the random access response message sent by the base station within the time bucket of which the length is $T_{RAR}$ and there are no segment resources in the selected ERARs, the UE selects the next available ERAR to resend the enhanced random access sequence; and Flow 2: the time bucket of which the length is $T_{RAR}$ is after the ERARs selected by the UE, and if the UE does not detect the random access response message sent by the base station within the time bucket of which the length is $T_{RAR}$, the UE may select the next available ERAR to resend the enhanced random access sequence.

Solution 2:

(1) A PRACH consists of one or more ERARs, and UE sends an enhanced random access sequence on the PRACH, wherein each ERAR includes one or more subcarriers on the frequency domain.

Preferably, different ERARs may include the same subcarriers or different subcarriers or partially the same subcarriers on the frequency domain, wherein a length $T_{E\_PRACH}$ of each ERAR on the time domain is a default configuration of a standard or sent to the UE through signalling by a base station.

Preferably, $T_{E\text{-}PRACH}$ may be $M_{frame}$ frames or $M_{subframe}$ subframes; and $M_{frame}$ or $M_{subframe}$ may be a default configuration of a standard or sent to the UE through signalling by the base station.

Preferably, starting time $T_{E\_PRACH\_Start}$ of each ERAR on the time domain is a default configuration of a standard or sent to the UE through signalling by the base station.

Preferably, $T_{E\_PRACH\_Start}$ may be an index number of a frame or an index number of subframe; and $T_{E\_PRACH\_Start}$ is a default configuration of a standard or sent to the UE through signalling by the base station.

Preferably, each ERAR includes $K_{Unit}$ sending units of a random access sequence; and $K_{Unit}$ is a default configuration of a standard or sent to the UE through signalling by the base station.

Preferably, each sending unit occupies one or more subframes on the time domain, and occupies one or more subcarriers on the frequency domain.

Preferably, indexes of the subcarriers occupied by the sending units at different time-domain locations on the frequency domain may be the same or different.

Preferably, the time-domain locations refer to subframe location information occupied by the sending units.

Preferably, one sending unit is allocated to each subframe of each ERAR.

Preferably, the numbers of the sending units of a random access sequence included in different ERARs may be the same or different.

Preferably, the enhanced random access sequence refers to one of:

a random access sequence which is a default configuration of a standard or notified to the UE through signalling by the base station; and a repetitive structure of the random access sequence which is the default configuration of a standard or notified to the UE through signalling by the base station.

Preferably, the repetitive structure of the random access sequence includes one of:

a structure obtained by directly repeating the random access sequence for N times; and a structure obtained by selecting N random access sequences according to a preset principle, wherein the preset principle is a default configuration of a standard or sent to the UE through signalling by the base station; and the N random access sequences may include the same sequences.

Preferably, N is smaller than or equal to the total number of the sending units of a random access sequence included in the ERARs.

Preferably, when the repetitive structure of the random access sequence is the structure obtained by directly repeating the random access sequence for N times, an index of the random access sequence is in a mapping relationship with the repetition times N, that is, the times N for which the random access sequence needs to be repeated can be known by virtue of the index of the random access sequence; and the mapping relationship is a default configuration of a standard or sent to the UE through signalling by the base station.

As a preferred implementation mode, the operation that the UE sends the enhanced random access sequence on the PRACH includes that: the UE selects one ERAR from an ERAR set of the PRACH, and sends the enhanced random access sequence on the selected ERAR.

Preferably, the ERAR is selected according to one of rules as follows:

the number of the sending units of a random access sequence included in the selected ERAR is the same as the number of the sending units required by the sending of the enhanced random access sequence;

the ERARs of which the numbers of the sending units of a random access sequence is more than or equal to the number of the sending units required by the sending of the enhanced random access sequence are selected from the ERAR set to form a set to be selected at first, and then the ERAR of which the number of the sending units of a random access sequence is the smallest is selected from the set to be selected;

the ERARs of which the numbers of the sending units of a random access sequence is more than or equal to the number of the sending units required by the sending of the enhanced random access sequence are selected from the ERAR set to form a set to be selected at first, then the ERAR of which the number of the sending units of a random access sequence is the smallest is selected from the set to be selected, and if there is more than one ERAR meeting the condition, the UE can select any one ERAR; and the ERARs of which the numbers of the sending units of a random access sequence is more than or equal to the number of the sending units required by the sending of the enhanced random access sequence are selected from the ERAR set to form a set to be selected at first, and then the ERAR is randomly selected from the set to be selected.

(2) The base station detects the enhanced random access sequence sent by the UE on the ERARs, and sends a random access response message to the UE.

(3) The UE detects the random access response message sent by the base station within the next time bucket of which a length is $T_{RAR}$.

Preferably, $T_{RAR}$ is a default configuration of a standard or sent to the UE through signalling by the base station.

Preferably, the time bucket of which the length is $T_{RAR}$ exists after the ERAR selected by the UE.

Preferably, if the UE does not detect the random access response message sent by the base station within the time bucket of which the length is $T_{RAR}$, the UE may select the next available ERAR to resend the enhanced random access sequence.

Preferably, the resent enhanced random access sequence is longer than the previously sent enhanced random access sequence on the time domain; or the structure repetition times N of the random access sequence in the resent enhanced random access sequence is larger.

Preferred Embodiment 2

In the preferred embodiment, in a wireless communication system, an enhancement solution for a PRACH is as follows.

Figure 6:
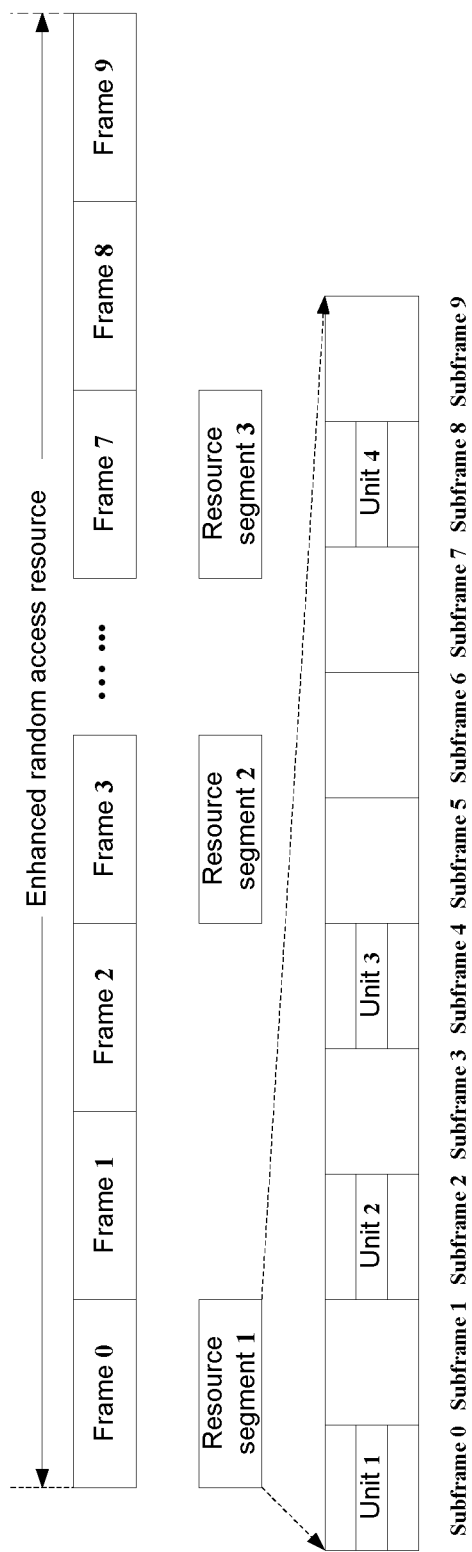
FIG. 6 is a first allocation diagram of Enhanced Random Access Resource (ERAR) according to an embodiment of the disclosure.

(1) The PRACH consists of one or more ERARs, and FIG. 6 is a composition diagram of an ERAR. Different ERARs may include the same subcarriers or different subcarriers or partially the same subcarriers on the frequency domain.

In the preferred embodiment, a length $T_{E\_PRACH}$ of each ERAR on the time domain is 10 frames, specifically including Frame0~Frame9, and each ERAR includes three resource segments, i.e. Segment1, Segment2 and Segment3, of which each occupies the same time-domain length of one frame. Segment1 includes four sending units of a random access sequence, each sending unit occupies a time-domain length of one subframe, and occupies 72 subcarriers on the frequency domain. Frequency-domain subcarrier locations occupied by different sending units may be the same or different, and each subframe may include multiple sending units. The distribution of the sending units in Segment2 and Segment3 may be the same as or different from the distribution of the sending units in Segment1.

The configuration information may be a default configuration of a standard or sent to UE through signalling by a base station.

In the preferred embodiment, a length of a random access sequence is a subframe, and may be sent in a sending unit. The repetition times of the random access sequence which can be sent in each segment is 4, that is, each segment only supports the repetition times of one kind of random access sequences.

(2) The base station may cache data on all the segments in each ERAR, detect whether there is an enhanced random access sequence being sent on a current segment or not at the end of each segment, and jointly detect whether there is an enhanced random access sequence being sent on the current segment and previous segments or not. In the embodiment, the base station may independently detect whether there is an enhanced random access sequence being sent on Segment1 or not at the end of Segment1; at the end of Segment2, the base station may independently detect whether there is an enhanced random access sequence being sent on Segment2 or not, and jointly detect whether there is an enhanced random access sequence being sent on Segment1 and Segment2 or not; and at the end of Segment3, the base station adopts the same detection method for detection.

Preferably, the base station may be one or more of a MacroCell, a MicroCell, a PicoCell, a Femtocell and a Relay (3) In the preferred embodiment, if Unit1~Unit4 of Segment1 are supposed to be occupied by the enhanced random access sequence sending of UE1 on the ERARs (Frame0~Frame9), a sent enhanced random access sequence UE1_ESequence1 is a sequence obtained by repeating a random access sequence Sequence1 for 4 times, wherein Sequence1 occupies one unit.

A random access sequence selection method for UE1 is a default configuration of a standard or sent to UE1 through signalling by the base station; and the enhanced random access sequence UE1_ESequence1 of UE1 is four repeats of the random access sequence Sequence1, and the information is also a default configuration of a standard or sent to UE1 through signalling by the base station.

In addition, UE1_ESequence1 may also be formed by four random access sequences selected according to a preset principle, and the preset principle is a default configuration of a standard or sent to UE1 through signalling by the base station; and the four random access sequences may include the same random access sequences.

(4) UE1 detects a random access response message sent for UE1_ESequence1 by the base station within a time bucket of which a length is $T_{RAR}$ at the end of Segment1.

Related information of $T_{RAR}$ is also a default configuration of a standard or sent to UE1 through signalling by the base station.

Preferably, if UE1 detects the random access response message sent for UE1_ESequence1 by the base station within the time bucket of which the length is $T_{RAR}$, a subsequent random access flow is finished according to the random access response message.

Preferably, if UE1 does not detect the random access response message sent for UE1_ESequence1 by the base station within the time bucket of which the length is $T_{RAR}$ and there are segment resources in the ERARs (Frame0~Frame9) after $T_{RAR}$, UE1 sends an enhanced random access sequence UE1_ESequence2 on the next available segment resource, and step (4) is repeated.

Wherein, UE1_ESequence2 may be UE1_ESequence1 or four repeats of another random access sequence, but the base station needs to know the other random access sequence in advance. In the embodiment, if UE1_ESequence2 is supposed to be UE1_ESequence1 and the next segment available for UE1 is Segment3, UE1 sends UE1_ESequence1 on Segment3.

Preferably, if UE1 does not detect the random access response message sent for UE1_ESequence1 by the base station within the time bucket of which the length is $T_{RAR}$ and there are no segment resources in the ERARs (Frame 0~Frame 9) after $T_{RAR}$, UE1 may select the next available ERAR to resend the enhanced random access sequence.

Preferred Embodiment 3

In the preferred embodiment, in a wireless communication system, an enhancement solution for a PRACH is as follows.

(1) The PRACH consists of one or more ERARs, and FIG. 6 is a composition diagram of an ERAR. Different ERARs may include the same subcarriers or different subcarriers or partially the same subcarriers on the frequency domain.

In the preferred embodiment, a length $T_{E\_PRACH}$ of each ERAR on the time domain is 10 frames, specifically including Frame0~Frame9, and each ERAR includes three resource segments, i.e. Segment1, Segment2 and Segment3, of which each occupies the same time-domain length of one frame. Segment1 includes four sending units of a random access sequence, each sending unit occupies a time-domain length of one subframe, and occupies 72 subcarriers on the frequency domain, frequency-domain subcarrier locations occupied by different sending units may be the same or different, and each subframe may include multiple sending units. The distribution of the sending units in Segment2 and Segment3 may be the same as or different from the distribution of the sending units in Segment1.

The configuration information may be a default configuration of a standard or sent to UE through signalling by a base station.

In the embodiment, a length of a random access sequence is a subframe, and may be sent in a sending unit. The repetition times of the random access sequence which can be sent in each segment is 2 or 4, that is, each segment only supports two repetition times of the random access sequence. For example, two repeats of the random access sequence may be sent in Unit1 and Unit2 or Unit3 and Unit4; and four repeats of the random access sequence are sent in Unit1, Unit2, Unit3 and Unit4.

(2) The base station may cache data on all the segments in each ERAR, detect whether there is an enhanced random access sequence being sent on a current segment or not at the end of each segment, and jointly detect whether there is an enhanced random access sequence being sent on the current segment and previous segments or not. In the embodiment, the base station may independently detect whether there is an enhanced random access sequence being sent on Segment1 or not at the end of Segment1; at the end of Segment2, the base station may independently detect whether there is an enhanced random access sequence being sent on Segment2 or not, and jointly detect whether there is an enhanced random access sequence being sent on Segment1 and Segment2 or not; and at the end of Segment3, the base station adopts the same detection method for detection.

Preferably, the base station may be one or more of a MacroCell, a MicroCell, a PicoCell, a Femtocell and a Relay (3) In the preferred embodiment, if Unit1~Unit4 of Segment1 are supposed to be occupied by the enhanced random access sequence sending of UE1 on the ERARs (Frame0~Frame9), a sent enhanced random access sequence UE1_ESequence1 is a sequence obtained by repeating a random access sequence Sequence1 for 4 times, wherein Sequence1 occupies one unit.

A random access sequence selection method for UE1 is a default configuration of a standard or sent to UE1 through signalling by the base station; and the enhanced random access sequence UE1_ESequence1 of UE1 is four repeats of the random access sequence Sequence1, and the information is also a default configuration of a standard or sent to UE1 through signalling by the base station.

As another preferred implementation mode, UE1_ESequence1 may also be formed by four random access sequences selected according to a preset principle, and the preset principle is a default configuration of a standard or sent to UE1 through signalling by the base station; and the four random access sequences may include the same random access sequences.

(4) UE1 detects a random access response message sent for UE1_ESequence1 by the base station within a time bucket of which a length is $T_{RAR}$ at the end of Segment1. Related information of $T_{RAR}$ is also a default configuration of a standard or sent to UE1 through signalling by the base station.

Preferably, if UE1 detects the random access response message sent for UE1_ESequence1 by the base station within the time bucket of which the length is $T_{RAR}$, a subsequent random access flow is finished according to the random access response message.

Preferably, if UE1 does not detect the random access response message sent for UE1_ESequence1 by the base station within the time bucket of which the length is $T_{RAR}$ and there are segment resources in the ERARs (Frame0~Frame9) after $T_{RAR}$, UE1 sends an enhanced random access sequence UE1_ESequence2 on the next available segment resource, and step (4) is repeated.

Wherein, UE1_ESequence2 may be UE1_ESequence1 or four repeats of another random access sequence, but the base station needs to know the other random access sequence in advance. In the embodiment, if UE1_ESequence2 is supposed to be UE1_ESequence1 and the next segment available for UE1 is Segment3, UE1 sends UE1_ESequence1 on Segment3.

Preferably, if UE1 does not detect the random access response message sent for UE1_ESequence1 by the base station within the time bucket of which the length is $T_{RAR}$ and there are no segment resources in the ERARs (Frame0~Frame9) after $T_{RAR}$, UE1 may select the next available ERAR to resend the enhanced random access sequence.

(5) In the preferred embodiment, if UE2 sends the enhanced random access sequence on ERARs (Frame0~Frame9) and Unit1~Unit2 of Segment1 are occupied, the sent enhanced random access sequence UE2_ESequence1 is two repeats of a random access sequence Sequence2, wherein Sequence2 occupies one Unit.

A random access sequence selection method for UE2 is a default configuration of a standard or sent to UE2 through signalling by the base station; and the enhanced random access sequence UE2_ESequence1 of UE2 is two repeats of the random access sequence Sequence2, and the information is also a default configuration of a standard or sent to UE2 through signalling by the base station.

As a preferred implementation mode, UE2_ESequence1 may also be formed by two random access sequences selected according to a preset principle, and the preset principle is a default configuration of a standard or sent to UE2 through signalling by the base station; and the two random access sequences may include the same random access sequences.

(6) UE2 detects a random access response message sent for UE2_ESequence1 by the base station within a time bucket of which a length is $T_{RAR}$ at the end of Segment1.

Preferably, related information of $T_{RAR}$ is also a default configuration of a standard or sent to UE2 through signalling by the base station.

Preferably, if UE2 detects the random access response message sent for UE2_ESequence1 by the base station within the time bucket of which the length is $T_{RAR}$, a subsequent random access flow is finished according to the random access response message.

Preferably, if UE2 does not detect the random access response message sent for UE2_ESequence1 by the base station within the time bucket of which the length is $T_{RAR}$ and there are segment resources in the ERARs (Frame0~Frame9) after $T_{RAR}$, UE2 sends an enhanced random access sequence UE2_ESequence2 on the next available segment resource, and step (6) is repeated.

Preferably, UE2_ESequence2 may be UE2_ESequence1 or two repeats of another random access sequence, but the base station needs to know the other random access sequence in advance. In the embodiment, if UE2_ESequence2 is supposed to be UE2_ESequence1 and the next segment available for UE2 is Segment2, UE2 sends UE2_ESequence1 on Segment2.

If UE2 does not detect the random access response message sent for UE2_ESequence1 by the base station within the time bucket of which the length is $T_{RAR}$ and there are no segment resources in the ERARs (Frame0~Frame9) after $T_{RAR}$, UE2 may select the next available ERAR to resend the enhanced random access sequence.

Preferred Embodiment 4

In the preferred embodiment, in a wireless communication system, an enhancement solution for a PRACH is as follows.

(1) Unit1~Unit8 of Segment1 and Segment2 are occupied by the enhanced random access sequence sending of UE3 on ERARs (Frame0~Frame9), and a sent enhanced random access sequence UE3_ESequence1 is eight repeats of a random access sequence Sequence3, wherein Sequence3 occupies one Unit.

A random access sequence selection method for UE3 is a default configuration of a standard or sent to UE3 through signalling by a base station; and the enhanced random access sequence UE3_ESequence1 of UE3 is eight repeats of the random access sequence Sequence3, and the information is also a default configuration of a standard or sent to UE3 through signalling by the base station.

Preferably, UE3_ESequence1 may also be formed by eight random access sequences selected according to a preset principle, and the preset principle is a default configuration of a standard or sent to UE3 through signalling by the base station; and the eight random access sequences may include the same random access sequences.

(2) UE3 detects a random access response message sent for UE3_ESequence1 by the base station within a time bucket of which a length is $T_{RAR}$ at the end of Segment2; and related information of $T_{RAR}$ is also a default configuration of a standard or sent to UE3 through signalling by the base station.

Preferably, if UE3 detects the random access response message sent for UE3_ESequence1 by the base station within the time bucket of which the length is $T_{RAR}$, a subsequent random access flow is finished according to the random access response message.

If UE3 does not detect the random access response message sent for UE3_ESequence1 by the base station within the time bucket of which the length is $T_{RAR}$ and there are at least two segment resources in the ERARs (Frame0~Frame9) after $T_{RAR}$, UE3 sends an enhanced random access sequence UE3_ESequence2 on the next two available segment resources, and step (2) is repeated.

Preferably, UE3_ESequence2 may be UE3_ESequence1 or eight repeats of another random access sequence, but the base station needs to know the other random access sequence in advance.

If UE3 does not detect the random access response message sent for UE3_ESequence1 by the base station within the time bucket of which the length is $T_{RAR}$ and there are less than two segment resources in the ERARs (Frame0~Frame9) after $T_{RAR}$, UE3 may select the next available ERAR to resend the enhanced random access sequence.

Preferred Embodiment 5

In the preferred embodiment, in a wireless communication system, an enhancement solution for a PRACH is as follows.

Figure 8:
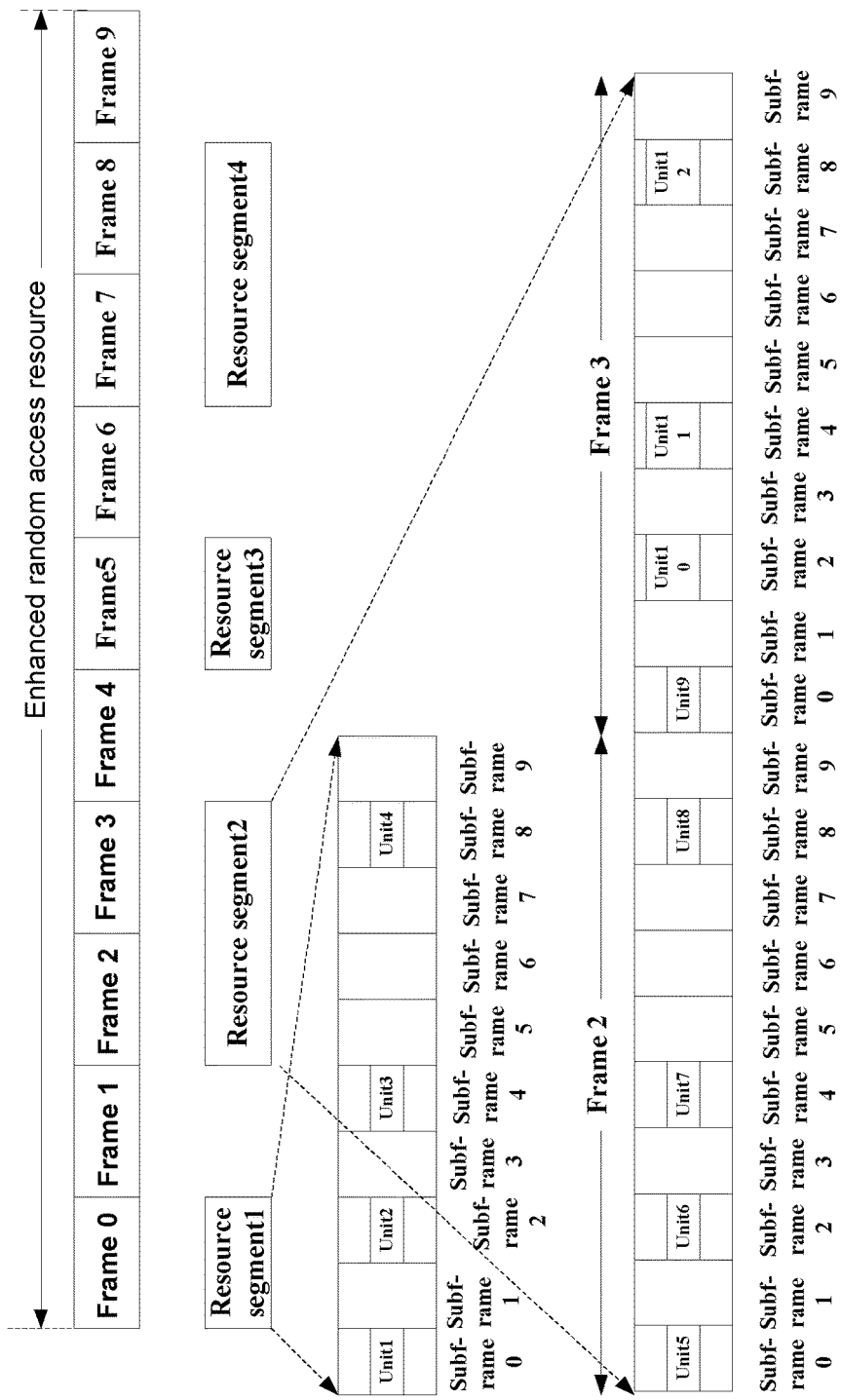
FIG. 8 is a third allocation diagram of an ERAR according to an embodiment of the disclosure.

(1) The PRACH consists of one or more ERARs, and FIG. 8 is a composition diagram of an ERAR. Different ERARs may include the same subcarriers or different subcarriers or partially the same subcarriers on the frequency domain.

In the preferred embodiment, a length $T_{E\_PRACH}$ of each ERAR on the time domain is 10 frames, specifically including Frame0~Frame9, and each ERAR includes four resource segments, i.e. Segment1, Segment2, Segment3 and Segment4. Each of Segment1 and Segment3 occupies the same time-domain length of one frame, and includes four sending units of a random access sequence, each sending unit occupies a time-domain length of one subframe, and occupies 72 subcarriers on the frequency domain, frequency-domain subcarrier locations occupied by different sending units may be the same or different, and each subframe may include multiple sending units. The distribution of the sending units in Segment3 may be the same as or different from the distribution of the sending units in Segment1. Each of Segment2 and Segment4 occupies the same time-domain length of two frames, and includes eight sending units of a random access sequence, each sending unit occupies a time-domain length of one subframe, and occupies 72 subcarriers on the frequency domain, frequency-domain subcarrier locations occupied by different sending units may be the same or different, and each subframe may include multiple sending units. The distribution of the sending units in Segment2 may be the same as or different from the distribution of the sending units in Segment4.

The configuration information may be a default configuration of a standard or sent to UE through signalling by a base station.

(2) The base station may cache data on all the segments in each ERAR, detect whether there is an enhanced random access sequence being sent on a current segment or not at the end of each segment, and jointly detect whether there is an enhanced random access sequence being sent on the current segment and previous segments with the same configurations (with the same time-domain lengths sand supporting the same units) or not. In the embodiment, the base station may independently detect whether there is an enhanced random access sequence being sent on Segment1 or not at the end of Segment1; at the end of Segment3, the base station may independently detect whether there is an enhanced random access sequence being sent on Segment3 or not, and jointly detect whether there is an enhanced random access sequence being sent on Segment1 and Segment3 or not; and the same detection method is adopted for the detection of Segment2 and Segment4.

Preferably, the base station may be one or more of a MacroCell, a MicroCell, a PicoCell, a Femtocell and a Relay (3) In the preferred embodiment, if Unit1~Unit4 of Segment1 are supposed to be occupied by the enhanced random access sequence sending of UE1 on the ERARs (Frame0~Frame9), a sent enhanced random access sequence UE1_ESequence1 is a sequence obtained by repeating a random access sequence Sequence1 for 4 times, wherein Sequence1 occupies one unit.

A random access sequence selection method for UE1 is a default configuration of a standard or sent to UE1 through signalling by the base station; and the enhanced random access sequence UE1_ESequence1 of UE1 is four repeats of the random access sequence Sequence1, and the information is also a default configuration of a standard or sent to UE1 through signalling by the base station.

Preferably, UE1_ESequence1 may also be formed by four random access sequences selected according to a preset principle, and the preset principle is a default configuration of a standard or sent to UE1 through signalling by the base station; and the four random access sequences may include the same random access sequences.

(4) UE1 detects a random access response message sent for UE1_ESequence1 by the base station within a time bucket of which a length is $T_{RAR}$ at the end of Segment1; and related information of $T_{RAR}$ is also a default configuration of a standard or sent to UE1 through signalling by the base station.

As a preferred implementation mode, if UE1 detects the random access response message sent for UE1_ESequence1 by the base station within the time bucket of which the length is $T_{RAR}$, a subsequent random access flow is finished according to the random access response message.

If UE1 does not detect the random access response message sent for UE1_ESequence1 by the base station within the time bucket of which the length is $T_{RAR}$ and there are segment resources with configurations the same as those of Segment1 in the ERARs (Frame0~Frame9) after $T_{RAR}$, UE1 sends an enhanced random access sequence UE1_ESequence2 on the next available segment resource, and step (4) is repeated.

Preferably, UE1_ESequence2 may be UE1_ESequence1 or four repeats of another random access sequence, but the base station needs to know the other random access sequence in advance. In the embodiment, if UE1_ESequence2 is supposed to be UE1_ESequence1 and the next segment available for UE1 is Segment3, UE1 sends UE1_ESequence1 on Segment3.

If UE1 does not detect the random access response message sent for UE1_ESequence1 by the base station within the time bucket of which the length is $T_{RAR}$ and there are no segment resources with configurations the same as those of Segment1 in the ERARs (Frame0~Frame9) after $T_{RAR}$, UE1 may select the next available ERAR to resend the enhanced random access sequence.

(5) In the preferred embodiment, if Unit5~Unit12 of Segment2 are supposed to be occupied by the enhanced random access sequence sending of UE2 on ERARs (Frame0~Frame9), the sent enhanced random access sequence UE2_ESequence1 is eight repeats of a random access sequence Sequence2, wherein Sequence2 occupies one Unit.

A random access sequence selection method for UE2 is a default configuration of a standard or sent to UE2 through signalling by the base station; and the enhanced random access sequence UE2_ESequence1 of UE2 is eight repeats of the random access sequence Sequence2, and the information is also a default configuration of a standard or sent to UE2 through signalling by the base station.

Preferably, UE2_ESequence1 may also be formed by eight random access sequences selected according to a preset principle, and the preset principle is a default configuration of a standard or sent to UE2 through signalling by the base station; and the eight random access sequences may include the same random access sequences.

(6) UE2 detects a random access response message sent for UE2_ESequence1 by the base station within a time bucket of which a length is $T_{RAR}$ at the end of Segment1; and related information of $T_{RAR}$ is also a default configuration of a standard or sent to UE2 through signalling by the base station.

As a preferred implementation mode, if UE2 detects the random access response message sent for UE2_ESequence1 by the base station within the time bucket of which the length is $T_{RAR}$, a subsequent random access flow is finished according to the random access response message.

If UE2 does not detect the random access response message sent for UE2_ESequence1 by the base station within the time bucket of which the length is $T_{RAR}$ and there are segment resources with configurations the same as those of Segment2 in the ERARs (Frame0~Frame9) after $T_{RAR}$, UE2 sends an enhanced random access sequence UE2_ESequence2 on the next available segment resource, and step (4) is repeated.

Wherein, UE2_ESequence2 may be UE2_ESequence1 or eight repeats of another random access sequence, but the base station needs to know the other random access sequence in advance. In the embodiment, if UE2_ESequence2 is supposed to be UE2_ESequence1 and the next segment available for UE2 is Segment4, UE2 sends UE2_ESequence1 on Segment4.

If UE2 does not detect the random access response message sent for UE2_ESequence1 by the base station within the time bucket of which the length is $T_{RAR}$ and there are no segment resources with configurations the same as those of Segment2 in the ERARs (Frame0~Frame9) after $T_{RAR}$, UE2 may select the next available ERAR to resend the enhanced random access sequence.

Preferred Embodiment 6

In the preferred embodiment, in a wireless communication system, an enhancement solution for a PRACH is as follows.

(1) The PRACH consists of one or more ERARs, and FIG. 6 is a composition diagram of an ERAR. Different ERARs may include the same subcarriers or different subcarriers or partially the same subcarriers on the frequency domain.

In the preferred embodiment, a length $T_{E\_PRACH}$ of each ERAR on the time domain is 10 frames, specifically including Frame0~Frame9, and each ERAR includes three resource segments, i.e. Segment1, Segment2 and Segment3, of which each occupies the same time-domain length of one frame. Segment1 includes four sending units of a random access sequence, each sending unit occupies a time-domain length of one subframe, and occupies 72 subcarriers on the frequency domain, frequency-domain subcarrier locations occupied by different sending units may be the same or different, and each subframe may include multiple sending units. The distribution of the sending units in Segment2 and Segment3 may be the same as or different from the distribution of the sending units in Segment1.

Preferably, the configuration information may be a default configuration of a standard or sent to UE through signalling by a base station.

In the preferred embodiment, a length of a random access sequence is a subframe, and may be sent in a sending unit. The repetition times of the random access sequence which can be sent in each segment is 4, that is, each segment only supports two repetition times of the random access sequence.

(2) In the preferred embodiment, if Unit1~Unit4 of Segment1 are supposed to be occupied by the enhanced random access sequence sending of UE1 on the ERARs (Frame0~Frame9), a sent enhanced random access sequence UE1_ESequence1 is a sequence obtained by repeating a random access sequence Sequence1 for 4 times, wherein Sequence1 occupies one unit.

A random access sequence selection method for UE1 is a default configuration of a standard or sent to UE1 through signalling by the base station; and the enhanced random access sequence UE1_ESequence1 of UE1 is four repeats of the random access sequence Sequence1, and the information is also a default configuration of a standard or sent to UE1 through signalling by the base station.

Preferably, UE1_ESequence1 may also be formed by four random access sequences selected according to a preset principle, and the preset principle is a default configuration of a standard or sent to UE1 through signalling by the base station; and the four random access sequences may include the same random access sequences.

(3) UE1 detects a random access response message sent for UE1_ESequence1 by the base station within a time bucket of which a length is $T_{RAR}$ at the end of Segment1.

Preferably, related information of $T_{RAR}$ is also a default configuration of a standard or sent to UE1 through signalling by the base station.

As a preferred implementation mode, if UE1 detects the random access response message sent for UE1_ESequence1 by the base station within the time bucket of which the length is $T_{RAR}$, a subsequent random access flow is finished according to the random access response message.

If UE1 does not detect the random access response message sent for UE1_ESequence1 by the base station within the time bucket of which the length is $T_{RAR}$, UE1 may select the next available ERAR to resend the enhanced random access sequence.

Preferred Embodiment 7

In the preferred embodiment, in a wireless communication system, an enhancement solution for a PRACH is as follows.

(1) The PRACH consists of one or more ERARs, and FIG. 6 is a composition diagram of an ERAR. Different ERARs may include the same subcarriers or different subcarriers or partially the same subcarriers on the frequency domain.

In the preferred embodiment, a length $T_{E\_PRACH}$ of each ERAR on the time domain is 10 frames, specifically including Frame0~Frame9, and each ERAR includes three resource segments, i.e. Segment1, Segment2 and Segment3, of which each occupies the same time-domain length of one frame. Segment1 includes four sending units of a random access sequence, each sending unit occupies a time-domain length of one subframe, and occupies 72 subcarriers on the frequency domain, frequency-domain subcarrier locations occupied by different sending units may be the same or different, and each subframe may include multiple sending units. The distribution of the sending units in Segment2 and Segment3 may be the same as or different from the distribution of the sending units in Segment1.

Preferably, the configuration information may be a default configuration of a standard or sent to UE through signalling by a base station.

In the preferred embodiment, a length of a random access sequence is a subframe, and may be sent in a sending unit. The repetition times of the random access sequence which can be sent in each segment is 2 or 4, that is, each segment only supports two repetition times of the random access sequence. For example, two repeats of the random access sequence may be sent in Unit1 and Unit2 or Unit3 and Unit4; and four repeats of the random access sequence are sent in Unit1, Unit2, Unit3 and Unit4.

(2) In the preferred embodiment, if UE1 sends an enhanced random access sequence on the ERARs (Frame0~Frame9), and occupies Unit1~Unit4 of Segment1, the sent enhanced random access sequence UE1_ESequence1 is a sequence obtained by repeating a random access sequence Sequence1 for 4 times, wherein Sequence1 occupies one unit.

A random access sequence selection method for UE1 is a default configuration of a standard or sent to UE1 through signalling by the base station; and the enhanced random access sequence UE1_ESequence1 of UE1 is four repeats of the random access sequence Sequence1, and the information is also a default configuration of a standard or sent to UE1 through signalling by the base station.

Preferably, UE1_ESequence1 may also be formed by four random access sequences selected according to a preset principle, and the preset principle is a default configuration of a standard or sent to UE1 through signalling by the base station; and the four random access sequences may include the same random access sequences.

(3) UE1 detects a random access response message sent for UE1_ESequence1 by the base station within a time bucket of which a length is $T_{RAR}$ at the end of Segment1.

Preferably, related information of $T_{RAR}$ is also a default configuration of a standard or sent to UE1 through signalling by the base station.

As a preferred implementation mode, if UE1 detects the random access response message sent for UE1_ESequence1 by the base station within the time bucket of which the length is $T_{RAR}$, a subsequent random access flow is finished according to the random access response message.

If UE1 does not detect the random access response message sent for UE1_ESequence1 by the base station within the time bucket of which the length is $T_{RAR}$, UE1 may select the next available ERAR to resend the enhanced random access sequence.

(4) In the preferred embodiment, if UE2 sends an enhanced random access sequence on the ERARs (Frame0~Frame9) and Unit1~Unit2 of Segment1 are occupied, the sent enhanced random access sequence UE2_ESequence1 is two repeats of a random access sequence Sequence2, wherein Sequence2 occupies one Unit.

A random access sequence selection method for UE2 is a default configuration of a standard or sent to UE2 through signalling by the base station; and the enhanced random access sequence UE2_ESequence1 of UE2 is two repeats of the random access sequence Sequence2, and the information is also a default configuration of a standard or sent to UE2 through signalling by the base station.

Preferably, UE2_ESequence1 may also be formed by two random access sequences selected according to a preset principle, and the preset principle is a default configuration of a standard or sent to UE2 through signalling by the base station; and the two random access sequences may include the same random access sequences.

(5) UE2 detects a random access response message sent for UE2_ESequence1 by the base station within a time bucket of which a length is $T_{RAR}$ at the end of Segment1. Preferably, related information of $T_{RAR}$ is also a default configuration of a standard or sent to UE2 through signalling by the base station.

As a preferred implementation mode, if UE2 detects the random access response message sent for UE2_ESequence1 by the base station within the time bucket of which the length is $T_{RAR}$, a subsequent random access flow is finished according to the random access response message.

If UE2 does not detect the random access response message sent for UE2_ESequence1 by the base station within the time bucket of which the length is $T_{RAR}$, UE2 may select the next available ERAR to resend the enhanced random access sequence.

Preferred Embodiment 8

In the preferred embodiment, in a wireless communication system, an enhancement solution for a PRACH is as follows.

(1) Unit1~Unit8 of Segment1 and Segment2 are occupied by the enhanced random access sequence sending of UE3 on ERARs (Frame0~Frame9), and a sent enhanced random access sequence UE3_ESequence1 is eight repeats of a random access sequence Sequent3, wherein Sequence3 occupies one Unit.

Preferably, a random access sequence selection method for UE3 is a default configuration of a standard or sent to UE3 through signalling by a base station; and the enhanced random access sequence UE3_ESequence1 of UE3 is eight repeats of the random access sequence Sequence3, and the information is also a default configuration of a standard or sent to UE3 through signalling by the base station.

Preferably, UE3_ESequence1 may also be formed by eight random access sequences selected according to a preset principle, and the preset principle is a default configuration of a standard or sent to UE3 through signalling by the base station; and the eight random access sequences may include the same random access sequences.

(2) UE3 detects a random access response message sent for UE3_ESequence1 by the base station within a time bucket of which a length is $T_{RAR}$ at the end of the ERARs (Frame0~Frame9); and related information of $T_{RAR}$ is also a default configuration of a standard or sent to UE3 through signalling by the base station.

Preferably, if UE3 detects the random access response message sent for UE3_ESequence1 by the base station within the time bucket of which the length is $T_{RAR}$, a subsequent random access flow is finished according to the random access response message.

If UE3 does not detect the random access response message sent for UE3_ESequence1 by the base station within the time bucket of which the length is $T_{RAR}$, UE3 may select the next available ERAR to resend the enhanced random access sequence.

Preferred Embodiment 9

In the preferred embodiment, in a wireless communication system, an enhancement solution for a PRACH is as follows.

(1) The PRACH consists of one or more ERARs, and FIG. 8 is a composition diagram of an ERAR. Different ERARs may include the same subcarriers or different subcarriers or partially the same subcarriers on the frequency domain.

In the preferred embodiment, a length $T_{E\_PRACH}$ of each ERAR on the time domain is 10 frames, specifically including Frame0~Frame9, and each ERAR includes four resource segments, i.e. Segment1, Segment2, Segment3 and Segment4. Each of Segment1 and Segment3 occupies the same time-domain length of one frame, and includes four sending units of a random access sequence, each sending unit occupies a time-domain length of one subframe, and occupies 72 subcarriers on the frequency domain, frequency-domain subcarrier locations occupied by different sending units may be the same or different, and each subframe may include multiple sending units. The distribution of the sending units in Segment3 may be the same as or different from the distribution of the sending units in Segment1. Each of Segment2 and Segment4 occupies the same time-domain length of two frames, and includes eight sending units of a random access sequence, each sending unit occupies a time-domain length of one subframe, and occupies 72 subcarriers on the frequency domain, frequency-domain subcarrier locations occupied by different sending units may be the same or different, and each subframe may include multiple sending units. The distribution of the sending units in Segment2 may be the same as or different from the distribution of the sending units in Segment4.

Preferably, the configuration information may be a default configuration of a standard or sent to UE through signalling by a base station.

(2) In the embodiment, if Unit1~Unit4 of Segment1 are supposed to be occupied by the enhanced random access sequence sending of UE1 on the ERARs (Frame0~Frame9), a sent enhanced random access sequence UE1_ESequence1 is a sequence obtained by repeating a random access sequence Sequence1 for 4 times, wherein Sequence1 occupies one unit.

A random access sequence selection method for UE1 is a default configuration of a standard or sent to UE1 through signalling by the base station; and the enhanced random access sequence UE1_ESequence1 of UE1 is four repeats of the random access sequence Sequence1, and the information is also a default configuration of a standard or sent to UE1 through signalling by the base station.

Preferably, UE1_ESequence1 may also be formed by four random access sequences selected according to a preset principle, and the preset principle is a default configuration of a standard or sent to UE1 through signalling by the base station; and the four random access sequences may include the same random access sequences.

(3) UE1 detects a random access response message sent for UE1_ESequence1 by the base station within a time bucket of which a length is $T_{RAR}$ at the end of the ERARs (Frame0~Frame9); and related information of $T_{RAR}$ is also a default configuration of a standard or sent to UE1 through signalling by the base station.

Preferably, if UE1 detects the random access response message sent for UE1_ESequence1 by the base station within the time bucket of which the length is $T_{RAR}$, a subsequent random access flow is finished according to the random access response message.

If UE1 does not detect the random access response message sent for UE1_ESequence1 by the base station within the time bucket of which the length is $T_{RAR}$, UE1 may select the next available ERAR to resend the enhanced random access sequence.

(4) In the preferred embodiment, if Unit5~Unit12 of Segment2 are supposed to be occupied by the enhanced random access sequence sending of UE2 on the ERARs (Frame0~Frame9), a sent enhanced random access sequence UE2_ESequence1 is eight repeats of a random access sequence Sequence2, wherein Sequence2 occupies one Unit.

A random access sequence selection method for UE2 is a default configuration of a standard or sent to UE2 through signalling by the base station; and the enhanced random access sequence UE2_ESequence1 of UE2 is eight repeats of the random access sequence Sequence2, and the information is also a default configuration of a standard or sent to UE2 through signalling by the base station.

Preferably, UE2_ESequence1 may also be formed by eight random access sequences selected according to a preset principle, and the preset principle is a default configuration of a standard or sent to UE2 through signalling by the base station; and the eight random access sequences may include the same random access sequences.

(5) UE2 detects a random access response message sent for UE2_ESequence1 by the base station within a time bucket of which a length is $T_{RAR}$ at the end of the ERARs (Frame0~Frame9); and related information of $T_{RAR}$ is also a default configuration of a standard or sent to UE2 through signalling by the base station.

As a preferred implementation mode, if UE2 detects the random access response message sent for UE2_ESequence1 by the base station within the time bucket of which the length is $T_{RAR}$, a subsequent random access flow is finished according to the random access response message.

If UE2 does not detect the random access response message sent for UE2_ESequence1 by the base station within the time bucket of which the length is $T_{RAR}$, UE2 may select the next available ERAR to resend the enhanced random access sequence.

Preferred Embodiment 10

Figure 9:
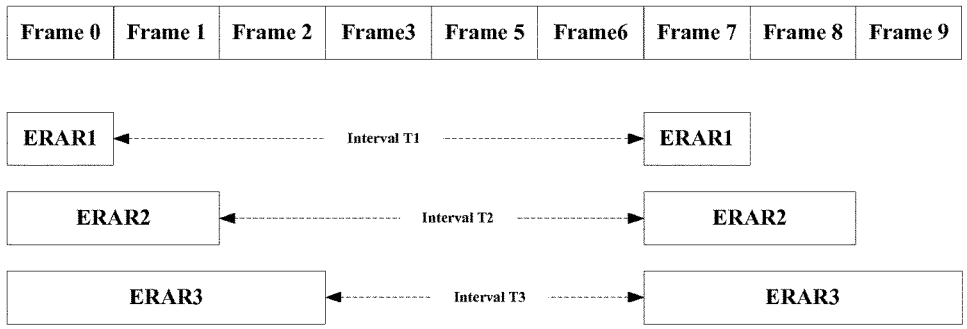
FIG. 9 is a fourth allocation diagram of an ERAR according to an embodiment of the disclosure.
Figure 10:
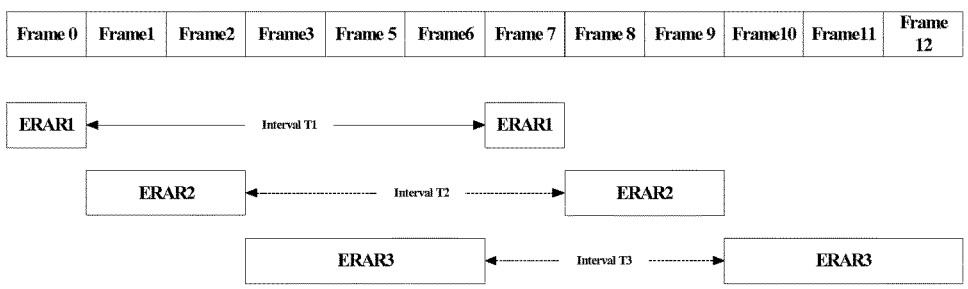
FIG. 10 is a fifth allocation diagram of an ERAR according to an embodiment of the disclosure.

(1) A PRACH consists of one or more ERARs, and different ERARs may include the same subcarriers or different subcarriers or partially the same subcarriers on the frequency domain. In the embodiment, the PRACH consists of three ERARs. As shown in FIG. 9, the three ERARs includes ERAR1, ERAR2 and ERAR3, of which lengths on the time domain are one frame, two frames and three frames respectively. In the embodiment, ERAR1 is allocated in Frame0 at first, and is continuously allocated after an interval T1 of five frames, i.e. in Frame7; ERAR2 is allocated in Frame0 and Frame1 at first, and is continuously allocated at an interval T2 of four frames, i.e. in Frame7 and Frame8; ERAR3 is allocated in Frame0, Frame1 and Frame2 at first, and is continuously allocated at an interval T3 of three frames, i.e. in Frame7, Frame8 and Frame9; and subsequent ERARS can be allocated in the same manner. Values of the intervals T1, T2 and T3 of ERAR1, ERAR2 and ERAR3 can be set to be the same or different, and are default configuration of a standards or notified to UE through signalling.

In the solution, index numbers of starting allocation frames of the ERARS are not required to be the same, so that resource allocation as shown in FIG. 5 or other resource allocation manners may be adopted for ERAR1, ERAR2 and ERAR3. A resource allocation manner as shown in FIG. 9 for ERAR1, ERAR2 and ERAR3 is adopted in the embodiment.

Figure 11:
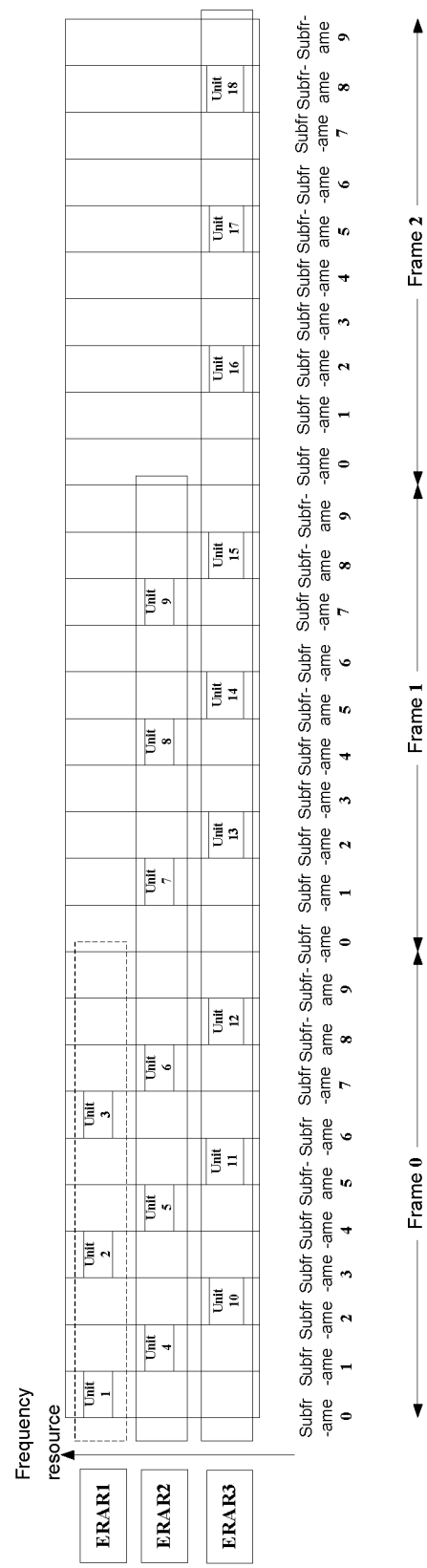
FIG. 11 is a first allocation diagram of an ERAR sending unit according to an embodiment of the disclosure.

Each ERAR includes one or more sending units of a random access sequence; and each sending unit occupies one or more subframes on the time domain, and occupies one or more subcarriers on the frequency domain. In the embodiment, a time-domain length of each sending unit is a subframe, and each sending unit occupies 72 subcarriers on the frequency domain. Frequency-domain subcarrier locations occupied by the sending units of the same ERAR in different subframes may be the same or different; frequency-domain subcarrier locations occupied by the sending units of different ERARs in the same subframe may be the same or different; and in the embodiment, a distribution manner for specific sending units of ERAR1, ERAR2 and ERAR3 is shown in FIG. 11, ERAR1 includes Unit1~Unit3, ERAR2 includes Unit4~Unit9, and ERAR3 includes Unit10~Unit18. Distribution manners for the sending units in ERAR1-type ERARs in Frame 0 and Frame7 and after Frame7 may be the same or different. Distribution manners for sending units in ERAR2-type ERARs in Frame0, Frame1, Frame7 and Frame8 and after Frame8 may be the same or different. Distribution manners for sending units in ERAR3-type ERARs in Frame0, Frame1, Frame2, Frame7, Frame8 and Frame9 and after Frame9 may be the same or different.

(2) A principle for the UE to select an ERAR for sending an enhanced random access sequence is as follows:

the number of the sending units of a random access sequence included in the selected ERAR is the same as the number of the sending units required by the sending of the enhanced random access sequence.

In the preferred embodiment, if an enhanced random access sequence UE1_ESequence1 sent by UE1 is supposed to be three repeats of a random access sequence Sequence1, Sequence1 occupying one Unit, UE1 sends the enhanced random access sequence on ERAR1, occupying Unit1~Unit3.

A random access sequence Sequence1 selection method for UE1 is a default configuration of a standard or sent to UE1 through signalling by a base station; and the enhanced random access sequence UE1_ESequence1 of UE1 is three repeats of the random access sequence Sequence1, and the information is also a default configuration of a standard or sent to UE1 through signalling by the base station.

Preferably, UE1_ESequence1 may also be formed by three random access sequences selected according to a preset principle, and the preset principle is a default configuration of a standard or sent to UE1 through signalling by the base station; and the three random access sequences may include the same random access sequences.

(3) The base station detects the enhanced random access sequence UE1_ESequence1 sent by UE1 on ERAR1, and sends a random access response message to UE1.

(4) UE1 detects the random access response message sent for UE1_ESequence1 by the base station within a time bucket of which a length is $T_{RAR}$ at the end of ERAR1; and related information of $T_{RAR}$ is also a default configuration of a standard or sent to UE1 through signalling by the base station.

As a preferred implementation mode, if UE1 detects the random access response message sent for UE1_ESequence1 by the base station within the time bucket of which the length is $T_{RAR}$, a subsequent random access flow is finished according to the random access response message.

If UE1 does not detect the random access response message sent for UE1_ESequence1 by the base station within the time bucket of which the length is $T_{RAR}$, UE1 may select the next available ERAR1-type ERAR to resend the enhanced random access sequence, for example, UE1_ESequence1 is resent or more repeats of the random access sequence Sequence1 are resent.

Preferred Embodiment 11

(1) A PRACH consists of one or more ERARs, and different ERARs may include the same subcarriers or different subcarriers or partially the same subcarriers on the frequency domain. In the embodiment, the PRACH consists of three ERARs, as shown in FIG. 9, including ERAR1, ERAR2 and ERAR3, of which lengths on the time domain are one frame, two frames and three frames respectively. In the embodiment, ERAR1 is allocated in Frame0 at first, and is continuously allocated after an interval T1 of five frames, i.e. in Frame7; ERAR2 is allocated in Frame0 and Frame1 at first, and is continuously allocated at an interval T2 of four frames, i.e. in Frame7 and Frame8; ERAR3 is allocated in Frame0, Frame1 and Frame2 at first, and is continuously allocated at an interval T3 of three frames, i.e. in Frame7, Frame8 and Frame9; and subsequent ERARs can be allocated in the same manner. Values of the intervals T1, T2 and T3 of ERAR1, ERAR2 and ERAR3 can be set to be the same or different, and are default configuration of a standards or notified to UE through signalling.

In the solution, index numbers of starting allocation frames of the ERARs are not required to be the same, so that resource allocation as shown in FIG. 5 or other resource allocation manners may be adopted for ERAR1, ERAR2 and ERAR3. A resource allocation manner as shown in FIG. 9 for ERAR1, ERAR2 and ERAR3 is adopted in the embodiment.

Each ERAR includes one or more sending units of a random access sequence; and each sending unit occupies one or more subframes on the time domain, and occupies one or more subcarriers on the frequency domain. In the embodiment, a time-domain length of each sending unit is a subframe, and each sending unit occupies 72 subcarriers on the frequency domain. Frequency-domain subcarrier locations occupied by the sending units of the same ERAR in different subframes may be the same or different; frequency-domain subcarrier locations occupied by the sending units of different ERAR in the same subframe may be the same or different; and in the embodiment, a distribution manner for specific sending units of ERAR1, ERAR2 and ERAR3 is shown in FIG. 11, ERAR1 includes Unit1~Unit3, ERAR2 includes Unit4~Unit9, and ERAR3 includes Unit10~Unit18. Distribution manners for the sending units in ERAR1-type ERARs in Frame 0 and Frame7 and after Frame7 may be the same or different. Distribution manners for sending units in ERAR2-type ERARs in Frame0, Frame1, Frame7 and Frame8 and after Frame8 may be the same or different. Distribution manners for sending units in ERAR3-type ERARs in Frame0, Frame1, Frame2, Frame7, Frame8 and Frame9 and after Frame9 may be the same or different.

(2) A principle for the UE to select an ERAR for sending an enhanced random access sequence is as follows:

the ERARs of which the number of the sending units of a random access sequence are more than or equal to the number of sending units required by the sending of an enhanced random access sequence are selected from an ERAR set to form a set to be selected at first, and then the ERAR of which the number of the sending units of a random access sequence is the smallest is selected from the set to be selected.

In the preferred embodiment, if an enhanced random access sequence UE1_ESequence1 sent by UE1 is supposed to be five repeats of a random access sequence Sequence1, Sequence1 occupying one Unit, UE1 sends the enhanced random access sequence on ERAR2, occupying five units in Unit4~Unit9. A specific selection method is a default configuration of a standard. In the embodiment, UE1 is supposed to finally select Unit4~Unit8.

Preferably, a random access sequence Sequence1 selection method for UE1 is a default configuration of a standard or sent to UE1 through signalling by a base station; and the enhanced random access sequence UE1_ESequence1 of UE1 is five repeats of the random access sequence Sequence1, and the information is also a default configuration of a standard or sent to UE1 through signalling by the base station.

Preferably, UE1_ESequence1 may also be formed by five random access sequences selected according to a preset principle, and the preset principle is a default configuration of a standard or sent to UE1 through signalling by the base station; and the five random access sequences may include the same random access sequences.

Preferably, the principle for the UE to select the ERAR for sending the enhanced random access sequence may also be as follows: the ERARs of which the number of the sending units of a random access sequence are more than or equal to the number of sending units required by the sending of the enhanced random access sequence are selected from the ERAR set to form the set to be selected at first, and then the ERAR is randomly selected from the set to be selected.

(3) The base station detects the enhanced random access sequence UE1_ESequence1 sent by UE1 on ERAR2, and sends a random access response message to UE1.

(4) UE1 detects the random access response message sent for UE1_ESequence1 by the base station within a time bucket of which a length is $T_{RAR}$ at the end of ERAR2; and related information of $T_{RAR}$ is also a default configuration of a standard or sent to UE1 through signalling by the base station.

Preferably, if UE1 detects the random access response message sent for UE1_ESequence1 by the base station within the time bucket of which the length is $T_{RAR}$, a subsequent random access flow is finished according to the random access response message.

If UE1 does not detect the random access response message sent for UE1_ESequence1 by the base station within the time bucket of which the length is $T_{RAR}$, UE1 may select the next available ERAR2-type ERAR to resend the enhanced random access sequence, for example, UE1_ESequence1 is resent or more repeats of the random access sequence Sequence1 are resent.

Preferred Embodiment 12

In the preferred embodiment, in a wireless communication system, an enhancement solution for a PRACH is as follows.

(1) The PRACH consists of one or more ERARs, and different ERARs may include the same subcarriers or different subcarriers or partially the same subcarriers on the frequency domain. In the embodiment, the PRACH consists of three ERARs, as shown in FIG. 9, including ERAR1, ERAR2 and ERAR3, of which lengths on the time domain are one frame, two frames and three frames respectively. In the embodiment, ERAR1 is allocated in Frame0 at first, and is continuously allocated after an interval T1 of five frames, i.e. in Frame7; ERAR2 is allocated in Frame0 and Frame1 at first, and is continuously allocated at an interval T2 of four frames, i.e. in Frame7 and Frame8; ERAR3 is allocated in Frame0, Frame1 and Frame2 at first, and is continuously allocated at an interval T3 of three frames, i.e. in Frame7, Frame8 and Frame9; and subsequent ERARs can be allocated in the same manner. Values of the intervals T1, T2 and T3 of ERAR1, ERAR2 and ERAR3 can be set to be the same or different, and are default configuration of a standards or notified to UE through signalling.

In the solution, index numbers of starting allocation frames of the ERARs are not required to be the same, so that resource allocation as shown in FIG. 5 or other resource allocation manners may be adopted for ERAR1, ERAR2 and ERAR3. A resource allocation manner as shown in FIG. 9 for ERAR1, ERAR2 and ERAR3 is adopted in the embodiment.

Each ERAR includes one or more sending units of a random access sequence; and each sending unit occupies one or more subframes on the time domain, and occupies one or more subcarriers on the frequency domain. In the embodiment, a time-domain length of each sending unit is a subframe, and each sending unit occupies 72 subcarriers on the frequency domain. Frequency-domain subcarrier locations occupied by the sending units of the same ERAR in different subframes may be the same or different; frequency-domain subcarrier locations occupied by the sending units of different ERARs in the same subframe may be the same or different; and in the embodiment, a distribution manner for specific sending units of ERAR1, ERAR2 and ERAR3 is shown in FIG. 11, ERAR1 includes Unit1~Unit3, ERAR2 includes Unit4~Unit9, and ERAR3 includes Unit10~Unit18. Distribution manners for the sending units in ERAR1-type ERARs in Frame 0 and Frame7 and after Frame7 may be the same or different. Distribution manners for sending units in ERAR2-type ERARs in Frame0, Frame1, Frame7 and Frame8 and after Frame8 may be the same or different. Distribution manners for sending units in ERAR3-type ERARs in Frame0, Frame1, Frame2, Frame7, Frame8 and Frame9 and after Frame9 may be the same or different.

(2) A principle for the UE to select an ERAR for sending an enhanced random access sequence is as follows:

the ERARs of which the number of the sending units of a random access sequence are more than or equal to the number of sending units required by the sending of an enhanced random access sequence are selected from an ERAR set to form a set to be selected at first, and then the ERAR of which the number of the sending units of a random access sequence is the smallest is selected from the set to be selected.

In the embodiment, if an enhanced random access sequence UE1_ESequence1 sent by UE1 is supposed to be five repeats of a random access sequence Sequence1, Sequence1 occupying one Unit, UE1 sends the enhanced random access sequence on ERAR2. The repetition times of Sequence1 supported by ERAR2 is at most 6, so that UE1 regulates UE1_ESequence1 to be six repeats of the random access sequence Sequence1, and occupies Unit4~Unit9.

A random access sequence Sequence1 selection method for UE1 is a default configuration of a standard or sent to UE1 through signalling by a base station; and the enhanced random access sequence UE1_ESequence1 of UE1 is six repeats of the random access sequence Sequence1, and the information is also a default configuration of a standard or sent to UE1 through signalling by the base station.

Preferably, UE1_ESequence1 may also be formed by sixth random access sequences selected according to a preset principle, and the preset principle is a default configuration of a standard or sent to UE1 through signalling by the base station; and the six random access sequences may include the same random access sequences.

Preferably, the principle for the UE to select the ERAR for sending the enhanced random access sequence may also be as follows: the ERARs of which the number of the sending units of a random access sequence are more than or equal to the number of sending units required by the sending of the enhanced random access sequence are selected from the ERAR set to form the set to be selected at first, and then the ERAR is randomly selected from the set to be selected.

(3) The base station detects the enhanced random access sequence UE1_ESequence1 sent by UE1 on ERAR2, and sends a random access response message to UE1.

(4) UE1 detects the random access response message sent for UE1_ESequence1 by the base station within a time bucket of which a length is $T_{RAR}$ at the end of ERAR2. Related information of $T_{RAR}$ is also a default configuration of a standard or sent to UE1 through signalling by the base station.

As a preferred implementation mode, if UE1 detects the random access response message sent for UE1_ESequence1 by the base station within the time bucket of which the length is $T_{RAR}$, a subsequent random access flow is finished according to the random access response message.

If UE1 does not detect the random access response message sent for UE1_ESequence1 by the base station within the time bucket of which the length is $T_{RAR}$, UE1 may select the next available ERAR2-type ERAR to resend the enhanced random access sequence, for example, UE1_ESequence1 is resent or more repeats of the random access sequence Sequence1 are resent.

Preferred Embodiment 13

In the preferred embodiment, in a wireless communication system, an enhancement solution for a PRACH is as follows.

(1) The PRACH consists of one or more ERARs, and different ERARs may include the same subcarriers or different subcarriers or partially the same subcarriers on the frequency domain. In the embodiment, the PRACH consists of three ERARs, as shown in FIG. 9, including ERAR1, ERAR2 and ERAR3, of which lengths on the time domain are one frame, two frames and three frames respectively. In the embodiment, ERAR1 is allocated in Frame0 at first, and is continuously allocated after an interval T1 of five frames, i.e. in Frame7; ERAR2 is allocated in Frame0 and Frame1 at first, and is continuously allocated at an interval T2 of four frames, i.e. in Frame7 and Frame8; ERAR3 is allocated in Frame0, Frame1 and Frame2 at first, and is continuously allocated at an interval T3 of three frames, i.e. in Frame7, Frame8 and Frame9; and subsequent ERARs can be allocated in the same manner. Values of the intervals T1, T2 and T3 of ERAR1, ERAR2 and ERAR3 can be set to be the same or different, and are default configuration of a standards or notified to UE through signalling.

In the solution, index numbers of starting allocation frames of the ERARs are not required to be the same, so that resource allocation as shown in FIG. 5 or other resource allocation manners may be adopted for ERAR1, ERAR2 and ERAR3. A resource allocation manner as shown in FIG. 9 for ERAR1, ERAR2 and ERAR3 is adopted in the embodiment.

Each ERAR includes one or more sending units of a random access sequence; and each sending unit occupies one or more subframes on the time domain, and occupies one or more subcarriers on the frequency domain. In the embodiment, a time-domain length of each sending unit is a subframe, and each sending unit occupies 72 subcarriers on the frequency domain. Frequency-domain subcarrier locations occupied by the sending units of the same ERAR in different subframes may be the same or different; frequency-domain subcarrier locations occupied by the sending units of different ERARs in the same subframe may be the same or different; and in the embodiment, a distribution manner for specific sending units of ERAR1, ERAR2 and ERAR3 is shown in FIG. 11, ERAR1 includes Unit1~Unit3, ERAR2 includes Unit4~Unit9, and ERAR3 includes Unit10~Unit18. Distribution manners for the sending units in ERAR1-type ERARs in Frame 0 and Frame7 and after Frame7 may be the same or different. Distribution manners for sending units in ERAR2-type ERARs in Frame0, Frame1, Frame7 and Frame8 and after Frame8 may be the same or different. Distribution manners for sending units in ERAR3-type ERARs in Frame0, Frame1, Frame2, Frame7, Frame8 and Frame9 and after Frame9 may be the same or different.

(2) A principle for the UE to select an ERAR for sending an enhanced random access sequence is as follows:

the number of the sending units of a random access sequence included in the selected ERAR is the same as the number of sending units required by the sending of an enhanced random access sequence.

In the embodiment, an index of a random access sequence is in a mapping relationship with supported sequence repetition times, for example, multiple optional random access sequences correspond to one sequence repetition times. In order to enhance random access performance, UE1 needs to repeatedly send the random access sequence for three times, and needs to select one of random access sequences supporting repeated sending for three times, for example, UE1 selects a random access sequence Sequence1 (supporting repeated sending for three times), wherein Sequence1 occupies one unit. An enhanced random access sequence UE1_ESequence1 sent by UE1 is three repeats of the random access sequence Sequence1, and the enhanced random access sequence is sent on ERAR1, occupying Unit1~Unit3.

Preferably, a random access sequence Sequence1 selection method for UE1 is a default configuration of a standard or sent to UE1 through signalling by a base station.

Preferably, UE1_ESequence1 may also be formed by three random access sequences selected according to a preset principle, and the preset principle is a default configuration of a standard or sent to UE1 through signalling by the base station; and the three random access sequences may include the same random access sequences.

(3) The base station detects the enhanced random access sequence UE1_ESequence1 sent by UE1 on ERAR1, and sends a random access response message to UE1.

ERAR1 only includes three units, so that only the enhanced random access sequence supporting the repeated sending of the random access sequence for three times can be supported, and the base station can reduce the number of times of blind detection to improve detection efficiency.

(4) UE1 detects the random access response message sent for UE1_ESequence1 by the base station within a time bucket of which a length is $T_{RAR}$ at the end of ERAR1.

Related information of $T_{RAR}$ is also a default configuration of a standard or sent to UE1 through signalling by the base station.

As a preferred implementation mode, if UE1 detects the random access response message sent for UE1_ESequence1 by the base station within the time bucket of which the length is $T_{RAR}$, a subsequent random access flow is finished according to the random access response message.

If UE1 does not detect the random access response message sent for UE1_ESequence1 by the base station within the time bucket of which the length is $T_{RAR}$, UE1 may select the next available ERAR1-type ERAR to resend the enhanced random access sequence, for example, UE1_ESequence1 is resent or more repeats of the random access sequence Sequence1 are resent.

Preferred Embodiment 14

In the preferred embodiment, in a wireless communication system, an enhancement solution for a PRACH is as follows.

(1) The PRACH consists of one or more ERARs, and different ERARs may include the same subcarriers or different subcarriers or partially the same subcarriers on the frequency domain. In the embodiment, the PRACH consists of three ERARs, as shown in FIG. 9, including ERAR1, ERAR2 and ERAR3, of which lengths on the time domain are one frame, two frames and three frames respectively. In the embodiment, ERAR1 is allocated in Frame0 at first, and is continuously allocated after an interval T1 of five frames, i.e. in Frame7; ERAR2 is allocated in Frame0 and Frame1 at first, and is continuously allocated at an interval T2 of four frames, i.e. in Frame7 and Frame8; ERAR3 is allocated in Frame0, Frame1 and Frame2 at first, and is continuously allocated at an interval T3 of three frames, i.e. in Frame7, Frame8 and Frame9; and subsequent ERARs can be allocated in the same manner. Values of the intervals T1, T2 and T3 of ERAR1, ERAR2 and ERAR3 can be set to be the same or different, and are default configuration of a standards or notified to UE through signalling.

In the solution, index numbers of starting allocation frames of the ERARs are not required to be the same, so that resource allocation as shown in FIG. 5 or other resource allocation manners may be adopted for ERAR1, ERAR2 and ERAR3. A resource allocation manner as shown in FIG. 9 for ERAR1, ERAR2 and ERAR3 is adopted in the embodiment.

Each ERAR includes one or more sending units of a random access sequence; and each sending unit occupies one or more subframes on the time domain, and occupies one or more subcarriers on the frequency domain. In the embodiment, a time-domain length of each sending unit is a subframe, and each sending unit occupies 72 subcarriers on the frequency domain. Frequency-domain subcarrier locations occupied by the sending units of the same ERAR in different subframes may be the same or different; frequency-domain subcarrier locations occupied by the sending units of different ERARs in the same subframe may be the same or different; and in the embodiment, a distribution manner for specific sending units of ERAR1, ERAR2 and ERAR3 is shown in FIG. 11, ERAR1 includes Unit1~Unit3, ERAR2 includes Unit4~Unit9, and ERAR3 includes Unit10~Unit18. Distribution manners for the sending units in ERAR1-type ERARs in Frame 0 and Frame7 and after Frame7 may be the same or different. Distribution manners for sending units in ERAR2-type ERARs in Frame0, Frame1, Frame7 and Frame8 and after Frame8 may be the same or different. Distribution manners for sending units in ERAR3-type ERARs in Frame0, Frame1, Frame2, Frame7, Frame8 and Frame9 and after Frame9 may be the same or different.

(2) A principle for the UE to select an ERAR for sending an enhanced random access sequence is as follows:

the ERARs of which the number of the sending units of a random access sequence are more than or equal to the number of sending units required by the sending of an enhanced random access sequence are selected from an ERAR set to form a set to be selected at first, and then the ERAR of which the number of the sending units of a random access sequence is the smallest is selected from the set to be selected.

In the preferred embodiment, an index of a random access sequence is in a mapping relationship with supported sequence repetition times, for example, multiple optional random access sequences correspond to one sequence repetition times. In order to enhance random access performance, UE1 needs to repeatedly send the random access sequence for five times, and needs to select one of random access sequences supporting repeated sending for five times, for example, UE1 selects a random access sequence Sequence1 (supporting repeated sending for five times), wherein Sequence1 occupies one unit. An enhanced random access sequence UE1_ESequence1 sent by UE1 is five repeats of the random access sequence Sequence1, and the enhanced random access sequence is sent on ERAR1, occupying five units in Unit4~Unit9. A specific selection method is a default configuration of a standard. In the embodiment, UE1 is supposed to finally select Unit4~Unit8.

A random access sequence Sequence1 selection method for UE1 is a default configuration of a standard or sent to UE1 through signalling by a base station.

Preferably, UE1_ESequence1 may also be formed by five random access sequences selected according to a preset principle, and the preset principle is a default configuration of a standard or sent to UE1 through signalling by the base station; and the five random access sequences may include the same random access sequences.

Preferably, the principle for the UE to select the ERAR for sending the enhanced random access sequence may also be as follows: the ERARs of which the number of the sending units of a random access sequence are more than or equal to the number of sending units required by the sending of the enhanced random access sequence are selected from the ERAR set to form the set to be selected at first, and then the ERAR is randomly selected from the set to be selected.

(3) The base station detects the enhanced random access sequence UE1_ESequence1 sent by UE1 on ERAR2, and sends a random access response message to UE1.

(4) UE1 detects the random access response message sent for UE1_ESequence1 by the base station within a time bucket of which a length is $T_{RAR}$ at the end of ERAR2; and related information of $T_{RAR}$ is also a default configuration of a standard or sent to UE1 through signalling by the base station.

As a preferred implementation mode, if UE1 detects the random access response message sent for UE1_ESequence1 by the base station within the time bucket of which the length is $T_{RAR}$, a subsequent random access flow is finished according to the random access response message.

If UE1 does not detect the random access response message sent for UE1_ESequence1 by the base station within the time bucket of which the length is $T_{RAR}$, UE1 may select the next available ERAR2-type ERAR to resend the enhanced random access sequence, for example, UE1_ESequence1 is resent or more repeats of the random access sequence Sequence1 are resent.

Preferred Embodiment 15

In the preferred embodiment, in a wireless communication system, an enhancement solution for a PRACH is as follows.

(1) The PRACH consists of one or more ERARs, and different ERARs may include the same subcarriers or different subcarriers or partially the same subcarriers on the frequency domain. In the embodiment, the PRACH consists of three ERARs, as shown in FIG. 9, including ERAR1, ERAR2 and ERAR3, of which lengths on the time domain are one frame, two frames and three frames respectively. In the embodiment, ERAR1 is allocated in Frame0 at first, and is continuously allocated after an interval T1 of five frames, i.e. in Frame7; ERAR2 is allocated in Frame0 and Frame1 at first, and is continuously allocated at an interval T2 of four frames, i.e. in Frame7 and Frame8; ERAR3 is allocated in Frame0, Frame1 and Frame2 at first, and is continuously allocated at an interval T3 of three frames, i.e. in Frame7, Frame8 and Frame9; and subsequent ERARs can be allocated in the same manner. Values of the intervals T1, T2 and T3 of ERAR1, ERAR2 and ERAR3 can be set to be the same or different, and are default configuration of a standards or notified to UE through signalling.

In the solution, index numbers of starting allocation frames of the ERARs are not required to be the same, so that resource allocation as shown in FIG. 5 or other resource allocation manners may be adopted for ERAR1, ERAR2 and ERAR3. A resource allocation manner as shown in FIG. 9 for ERAR1, ERAR2 and ERAR3 is adopted in the embodiment.

Each ERAR includes one or more sending units of a random access sequence; and each sending unit occupies one or more subframes on the time domain, and occupies one or more subcarriers on the frequency domain. In the embodiment, a time-domain length of each sending unit is a subframe, and each sending unit occupies 72 subcarriers on the frequency domain. Frequency-domain subcarrier locations occupied by the sending units of the same ERAR in different subframes may be the same or different; frequency-domain subcarrier locations occupied by the sending units of different ERARs in the same subframe may be the same or different; and in the embodiment, a distribution manner for specific sending units of ERAR1, ERAR2 and ERAR3 is shown in FIG. 11, ERAR1 includes Unit1~Unit3, ERAR2 includes Unit4~Unit9, and ERAR3 includes Unit10~Unit18. Distribution manners for the sending units in ERAR1-type ERARs in Frame 0 and Frame7 and after Frame7 may be the same or different. Distribution manners for sending units in ERAR2-type ERARs in Frame0, Frame1, Frame7 and Frame8 and after Frame8 may be the same or different. Distribution manners for sending units in ERAR3-type ERARs in Frame0, Frame1, Frame2, Frame7, Frame8 and Frame9 and after Frame9 may be the same or different.

(2) A principle for the UE to select an ERAR for sending an enhanced random access sequence is as follows:

the ERARs of which the number of the sending units of a random access sequence are more than or equal to the number of sending units required by the sending of an enhanced random access sequence are selected from an ERAR set to form a set to be selected at first, and then the ERAR of which the number of the sending units of a random access sequence is the smallest is selected from the set to be selected.

In the preferred embodiment, an index of a random access sequence is in a mapping relationship with supported sequence repetition times, for example, multiple optional random access sequences correspond to one sequence repetition times. In order to enhance random access performance, UE1 needs to repeatedly send the random access sequence for five times, and needs to select one of random access sequences supporting repeated sending for five times, for example, UE1 selects a random access sequence Sequence1 (supporting repeated sending for five times), wherein Sequence1 occupies one unit. UE1 determines to send an enhanced random access sequence on ERAR2 according to the selection principle for the ERAR. ERAR2 supports six repeats of Sequence1, so that UE1 regulates UE1_ESequence1 to be six repeats of the random access sequence Sequence1, and occupies Unit4~Unit9.

Preferably, a random access sequence Sequence1 selection method for UE1 is a default configuration of a standard or sent to UE1 through signalling by a base station.

Preferably, UE1_ESequence1 may also be formed by six random access sequences selected according to a preset principle, and the preset principle is a default configuration of a standard or sent to UE1 through signalling by the base station; and the six random access sequences may include the same random access sequences.

Preferably, the principle for the UE to select the ERAR for sending the enhanced random access sequence may also be as follows: the ERARs of which the number of the sending units of a random access sequence are more than or equal to the number of sending units required by the sending of the enhanced random access sequence are selected from the ERAR set to form the set to be selected at first, and then the ERAR is randomly selected from the set to be selected.

(3) The base station detects the enhanced random access sequence UE1_ESequence1 sent by UE1 on ERAR2, and sends a random access response message to UE1.

(4) UE1 detects the random access response message sent for UE1_ESequence1 by the base station within a time bucket of which a length is $T_{RAR}$ at the end of ERAR2; and related information of $T_{RAR}$ is also a default configuration of a standard or sent to UE1 through signalling by the base station.

As a preferred implementation mode, if UE1 detects the random access response message sent for UE1_ESequence1 by the base station within the time bucket of which the length is $T_{RAR}$, a subsequent random access flow is finished according to the random access response message.

If UE1 does not detect the random access response message sent for UE1_ESequence1 by the base station within the time bucket of which the length is $T_{RAR}$, UE1 may select the next available ERAR2-type ERAR to resend the enhanced random access sequence, for example, UE1_ESequence1 is resent or more repeats of the random access sequence Sequence1 are resent.

Preferred Embodiment 16

In the preferred embodiment, in a wireless communication system, an enhancement solution for a PRACH is as follows.

When there are at least two ERARs include the same number of units in an ERAR set, a principle for UE to select an ERAR for sending an enhanced random access sequence is as follows:

the ERARs of which the number of the sending units of a random access sequence are more than or equal to the number of sending units required by the sending of the enhanced random access sequence are selected from the ERAR set to form the set to be selected at first; then the ERAR of which the number of the sending units of a random access sequence is the smallest is selected from the set to be selected; and when there is more than one ERAR meeting the condition, the UE may select any one ERAR.

Preferred Embodiment 17

In the preferred embodiment, in a wireless communication system, an enhancement solution for a PRACH is as follows.

Figure 7:
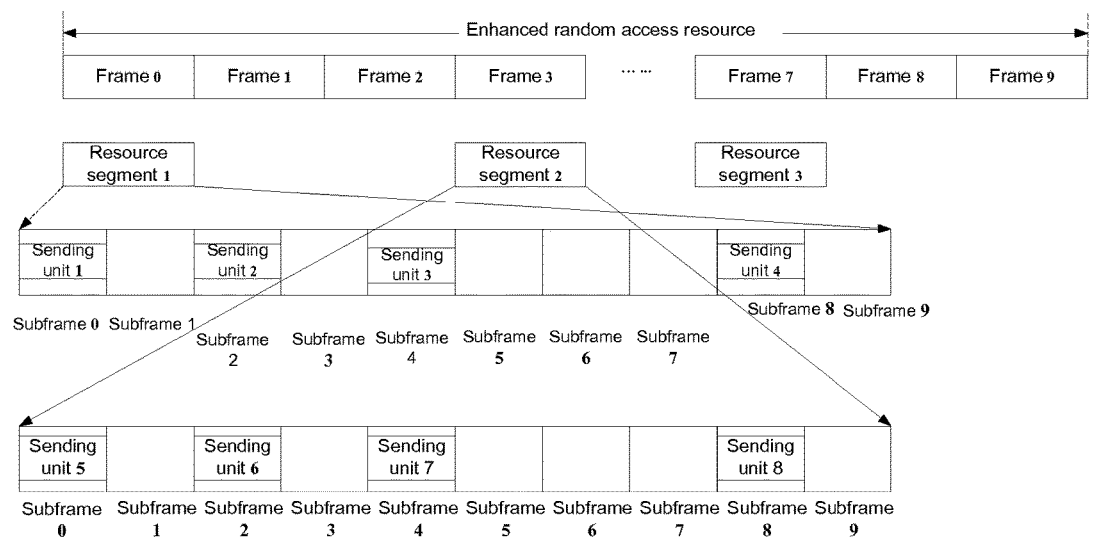
FIG. 7 is a second allocation diagram of an ERAR according to an embodiment of the disclosure.
Figure 12:
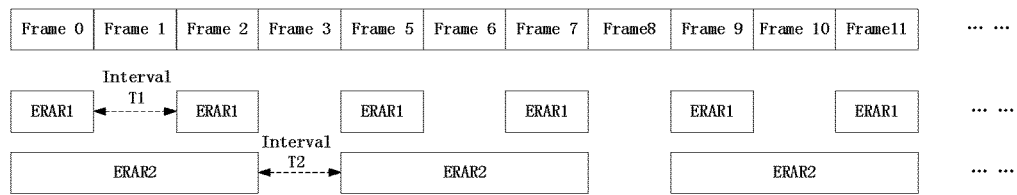
FIG. 12 is a sixth allocation diagram of an ERAR according to an embodiment of the disclosure.

(1) The PRACH consists of one or more ERARs, and different ERARs may include the same subcarriers or different subcarriers or partially the same subcarriers on the frequency domain. In the embodiment, the PRACH consists of two ERARs, as shown in FIG. 7, including ERAR1 and ERAR2 and ERAR3, of which lengths on the time domain are one frame and three frames respectively. In the embodiment, ERAR1 is allocated in Frame0 at first, and is continuously allocated after an interval T1 of one frame, i.e. in Frame2; ERAR2 is allocated in Frame0, Frame1 and Frame2 at first, and is continuously allocated at an interval T3 of one frame, i.e. in Frame5, Frame6 and Frame7; and subsequent ERARs can be allocated in the same manner. Values of the intervals T1 and T2 can be set to be the same or different, and are default configuration of a standards or notified to UE through signalling. In the solution, index numbers of starting allocation frames of the ERARs are not required to be the same, and FIG. 12 is only a diagram of an implementation manner.

Figure 13:
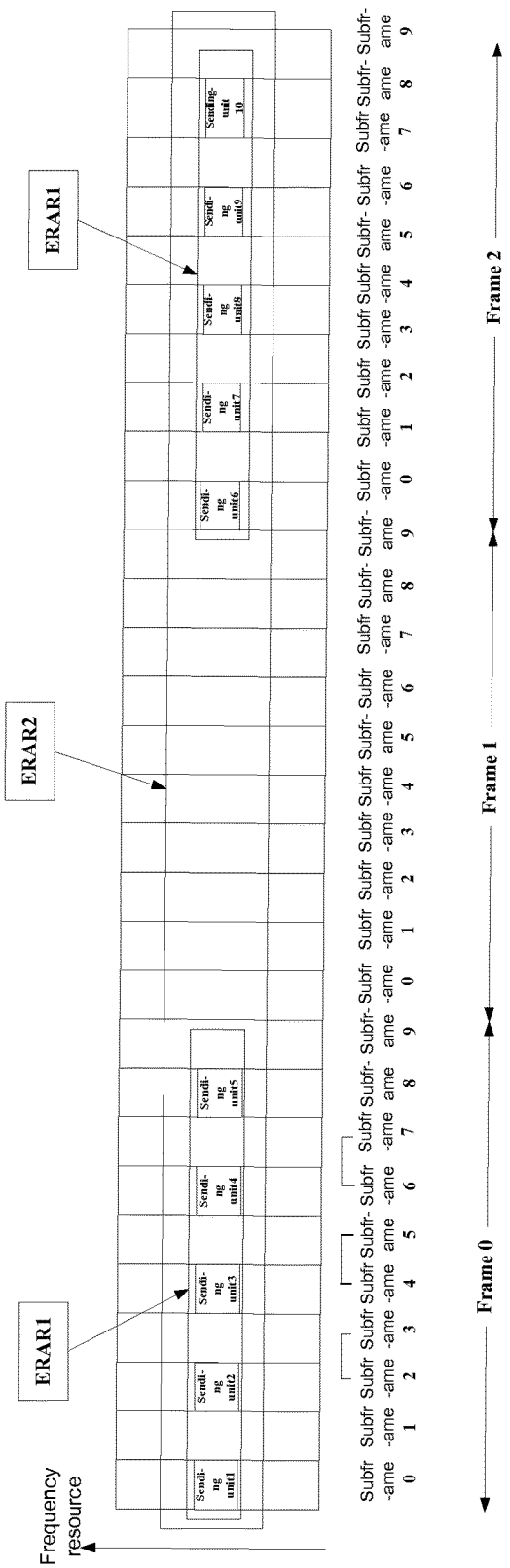
FIG. 13 is a second allocation diagram of an ERAR sending unit according to an embodiment of the disclosure.

Each ERAR includes one or more sending units of a random access sequence; and each sending unit occupies one or more subframes on the time domain, and occupies one or more subcarriers on the frequency domain. In the embodiment, a time-domain length of each sending unit is a subframe, and each sending unit occupies 72 subcarriers on the frequency domain. Frequency-domain subcarrier locations occupied by the sending units of the same ERAR in different subframes may be the same or different; frequency-domain subcarrier locations occupied by the sending units of different ERARs in the same subframe may be the same or different; and in the embodiment, a distribution manner for specific sending units of ERAR1, ERAR2 and ERAR3 is shown in FIG. 13, ERAR1 occupies five units, such as unit 1~Unit5 and Unit6~Unit10, and Unit1~Unit5 and Unit6~Unit10 may occupy the same subcarriers or different subcarriers on the frequency domain; and ERAR2 occupies 10 units, such as Unit1~Unit10.

(2) In the embodiment, if a type of UE (UE Type1) allows the sending of a random access sequence on each independent unit and a length of the sequence is matched with a size of the unit, a base station may generate a detection error during reception detection when another type of UE (UE Type2) needs to send an enhanced random access sequence (a generation manner for the enhanced random access sequence is repeating the random access sequence) on ERAR1 or ERAR2, and then the detected random access sequence cannot be distinguished whether to belong to UE Type 1 or UE Type2. Therefore, a solution is provided in the embodiment: for example, Sequence Group is a set of all random access sequences which may be used by UE Type1, K random access sequences which can be used only by UE Type2 are selected from the set.

(3) A principle for UE1 of UE Type2 to select an ERAR for sending an enhanced random access sequence is as follows:

the number of the sending units of a random access sequence included in the selected ERAR is the same as the number of sending units required by the sending of the enhanced random access sequence.

In the embodiment, an index of a random access sequence is in a mapping relationship with supported sequence repetition times, for example, multiple optional random access sequences correspond to one sequence repetition times. The optional random access sequences are selected from the K random access sequences which can be used only by UE Type2.

In order to enhance random access performance, UE1 of UE Type2 needs to repeatedly send the random access sequence for five times, and needs to select one of random access sequences supporting repeated sending for five times, for example, UE1 selects a random access sequence Sequence1 (supporting repeated sending for five times), wherein Sequence1 occupies one unit. An enhanced random access sequence UE1_ESequence1 sent by UE1 is five repeats of the random access sequence Sequence1, and the enhanced random access sequence is sent on ERAR1, occupying Unit1~Unit5.

A random access sequence Sequence1 selection method for UE1 is a default configuration of a standard or sent to UE1 through signalling by a base station.

In addition, UE1_ESequence1 may also be formed by five random access sequences selected according to a preset principle, and the preset principle is a default configuration of a standard or sent to UE1 through signalling by the base station; and the five random access sequences may include the same random access sequences.

(4) The base station detects the enhanced random access sequence UE1_ESequence1 sent by UE1 on ERAR1, and sends a random access response message to UE1.

(5) UE1 detects the random access response message sent for UE1_ESequence1 by the base station within a time bucket of which a length is $T_{RAR}$ at the end of ERAR1; and related information of $T_{RAR}$ is also a default configuration of a standard or sent to UE1 through signalling by the base station.

As a preferred implementation mode, if UE1 detects the random access response message sent for UE1_ESequence1 by the base station within the time bucket of which the length is $T_{RAR}$, a subsequent random access flow is finished according to the random access response message.

If UE1 does not detect the random access response message sent for UE1_ESequence1 by the base station within the time bucket of which the length is $T_{RAR}$, UE1 may select the next available ERAR1-type ERAR to resend the enhanced random access sequence, for example, UE1_ESequence1 is resent or more repeats of the random access sequence Sequence1 are resent.

Preferred Embodiment 18

In the preferred embodiment, in a wireless communication system, an enhancement solution for a PRACH is as follows.

(1) The PRACH consists of one or more ERARs, and different ERARs may include the same subcarriers or different subcarriers or partially the same subcarriers on the frequency domain. In the embodiment, the PRACH consists of two ERARs, as shown in FIG. 7, including ERAR1 and ERAR2 and ERAR3, of which lengths on the time domain are one frame and three frames respectively. In the embodiment, ERAR1 is allocated in Frame0 at first, and is continuously allocated after an interval T1 of one frame, i.e. in Frame2; ERAR2 is allocated in Frame0, Frame1 and Frame2 at first, and is continuously allocated at an interval T3 of one frame, i.e. in Frame5, Frame6 and Frame7; and subsequent ERARs can be allocated in the same manner. Values of the intervals T1 and T2 can be set to be the same or different, and are default configuration of a standards or notified to UE through signalling. In the solution, index numbers of starting allocation frames of the ERARs are not required to be the same, and FIG. 7 is only a diagram of an implementation manner.

Each ERAR includes one or more sending units of a random access sequence; and each sending unit occupies one or more subframes on the time domain, and occupies one or more subcarriers on the frequency domain. In the embodiment, a time-domain length of each sending unit is a subframe, and each sending unit occupies 72 subcarriers on the frequency domain. Frequency-domain subcarrier locations occupied by the sending units of the same ERAR in different subframes may be the same or different; frequency-domain subcarrier locations occupied by the sending units of different ERARs in the same subframe may be the same or different; and in the embodiment, a distribution manner for specific sending units of ERAR1, ERAR2 and ERAR3 is shown in FIG. 13, ERAR1 occupies five units, such as unit1~Unit5 and Unit6~Unit10, and Unit1~Unit5 and Unit6~Unit10 may occupy the same subcarriers or different subcarriers on the frequency domain; and ERAR2 occupies 10 units, such as Unit1~Unit10.

(2) In the embodiment, if a type of UE (UE Type1) allows the sending of a random access sequence on each independent unit and a length of the sequence is matched with a size of the unit, a base station may generate a detection error during reception detection when another type of UE (UE Type2) needs to send an enhanced random access sequence (a generation manner for the enhanced random access sequence is repeating the random access sequence) on ERAR1 or ERAR2, and then the detected random access sequence cannot be distinguished whether to belong to UE Type 1 or UE Type2. Therefore, a solution is provided in the embodiment: for example, Sequence Group is a set of all random access sequences which may be used by UE Type1, K random access sequences which can be used only by UE Type2 are selected from the set.

(3) A principle for UE1 of UE Type2 to select an ERAR for sending an enhanced random access sequence is as follows:

the ERARs of which the number of the sending units of a random access sequence are more than or equal to the number of sending units required by the sending of the enhanced random access sequence are selected from an ERAR set to form a set to be selected at first, and then the ERAR of which the number of the sending units of a random access sequence is the smallest is selected from the set to be selected.

In the embodiment, an index of a random access sequence is in a mapping relationship with supported sequence repetition times, for example, multiple optional random access sequences correspond to one sequence repetition times. The optional random access sequences are selected from the K random access sequences which can be used only by UE Type2.

Preferably, in order to enhance random access performance, UE1 of UE Type2 needs to repeatedly send the random access sequence for eight times, and needs to select one of random access sequences supporting repeated sending for eight times, for example, UE1 selects a random access sequence Sequence1 (supporting repeated sending for eight times), wherein Sequence1 occupies one unit. An enhanced random access sequence UE1_ESequence1 sent by UE1 is eight repeats of the random access sequence Sequence1, and the enhanced random access sequence is sent on ERAR2, occupying eight units in Unit1~Unit10. A specific selection method is a default configuration of a standard. In the embodiment, UE1 is supposed to finally select Unit1~Unit8.

A random access sequence Sequence1 selection method for UE1 is a default configuration of a standard or sent to UE1 through signalling by a base station; and the enhanced random access sequence UE1_ESequence1 of UE1 is eight repeats of the random access sequence Sequence1, and the information is also a default configuration of a standard or sent to UE1 through signalling by the base station.

Preferably, UE1_ESequence1 may also be formed by eight random access sequences selected according to a preset principle, and the preset principle is a default configuration of a standard or sent to UE1 through signalling by the base station; and the eight random access sequences may include the same random access sequences.

Preferably, the principle for UE1 to select the ERAR for sending the enhanced random access sequence may also be as follows:

the ERARs of which the number of the sending units of a random access sequence are more than or equal to the number of sending units required by the sending of the enhanced random access sequence are selected from the ERAR set to form the set to be selected at first, and then the ERAR is randomly selected from the set to be selected.

(4) The base station detects the enhanced random access sequence UE1_ESequence1 sent by UE1 on ERAR2, and sends a random access response message to UE1.

(5) UE1 detects the random access response message sent for UE1_ESequence1 by the base station within a time bucket of which a length is $T_{RAR}$ at the end of ERAR2; and related information of $T_{RAR}$ is also a default configuration of a standard or sent to UE1 through signalling by the base station.

As a preferred implementation mode, if UE1 detects the random access response message sent for UE1_ESequence1 by the base station within the time bucket of which the length is $T_{RAR}$, a subsequent random access flow is finished according to the random access response message.

If UE1 does not detect the random access response message sent for UE1_ESequence1 by the base station within the time bucket of which the length is $T_{RAR}$, UE1 may select the next available ERAR2-type ERAR to resend the enhanced random access sequence, for example, UE1_ESequence1 is resent or more repeats of the random access sequence Sequence1 are resent.

Preferred Embodiment 19

In the preferred embodiment, in a wireless communication system, an enhancement solution for a PRACH is as follows.

(1) The PRACH consists of one or more ERARs, and different ERARs may include the same subcarriers or different subcarriers or partially the same subcarriers on the frequency domain. In the embodiment, the PRACH consists of two ERARs, as shown in FIG. 7, including ERAR1 and ERAR2 and ERAR3, of which lengths on the time domain are one frame and three frames respectively. In the embodiment, ERAR1 is allocated in Frame0 at first, and is continuously allocated after an interval T1 of one frame, i.e. in Frame2; ERAR2 is allocated in Frame0, Frame1 and Frame2 at first, and is continuously allocated at an interval T3 of one frame, i.e. in Frame5, Frame6 and Frame7; and subsequent ERARs can be allocated in the same manner. Values of the intervals T1 and T2 can be set to be the same or different, and are default configuration of a standards or notified to UE through signalling. In the solution, index numbers of starting allocation frames of the ERARs are not required to be the same, and FIG. 7 is only a diagram of an implementation manner.

Each ERAR includes one or more sending units of a random access sequence; and each sending unit occupies one or more subframes on the time domain, and occupies one or more subcarriers on the frequency domain. In the embodiment, a time-domain length of each sending unit is a subframe, and each sending unit occupies 72 subcarriers on the frequency domain. Frequency-domain subcarrier locations occupied by the sending units of the same ERAR in different subframes may be the same or different; frequency-domain subcarrier locations occupied by the sending units of different ERARs in the same subframe may be the same or different; and in the embodiment, a distribution manner for specific sending units of ERAR1, ERAR2 and ERAR3 is shown in FIG. 13, ERAR1 occupies five units, such as Unit1~Unit5 and Unit6~Unit10, and Unit1~Unit5 and Unit6~Unit10 may occupy the same subcarriers or different subcarriers on the frequency domain; and ERAR2 occupies 10 units, such as Unit1~Unit10.

(2) In the embodiment, if a type of UE (UE Type1) allows the sending of a random access sequence on each independent unit and a length of the sequence is matched with a size of the unit, a base station may generate a detection error during reception detection when another type of UE (UE Type2) needs to send an enhanced random access sequence (a generation manner for the enhanced random access sequence is repeating the random access sequence) on ERAR1 or ERAR2, and then the detected random access sequence cannot be distinguished whether to belong to UE Type 1 or UE Type2. Therefore, a solution is provided in the embodiment: for example, Sequence Group is a set of all random access sequences which may be used by UE Type1, K random access sequences which can be used only by UE Type2 are selected from the set.

(3) A principle for UE1 of UE Type2 to select an ERAR for sending an enhanced random access sequence is as follows:

the ERARs of which the number of the sending units of a random access sequence are more than or equal to the number of sending units required by the sending of the enhanced random access sequence are selected from an ERAR set to form a set to be selected at first, and then the ERAR of which the number of the sending units of a random access sequence is the smallest is selected from the set to be selected.

In the preferred embodiment, an index of a random access sequence is in a mapping relationship with supported sequence repetition times, for example, multiple optional random access sequences correspond to one sequence repetition times. The optional random access sequences are selected from the K random access sequences which can be used only by UE Type2.

In order to enhance random access performance, UE1 of UE Type2 needs to repeatedly send the random access sequence for eight times, and needs to select one of random access sequences supporting repeated sending for eight times, for example, UE1 selects a random access sequence Sequence1 (supporting repeated sending for eight times), wherein Sequence1 occupies one unit. UE1 determines to send an enhanced random access sequence UE1_ESequence1 on ERAR2 according to the selection principle for the ERAR. ERAR2 supports 10 repeats of Sequence1, so that UE1 regulates UE1_ESequence1 to be 10 repeats of the random access sequence Sequence1, and occupies Unit1~Unit10.

Preferably, a random access sequence Sequence1 selection method for UE1 is a default configuration of a standard or sent to UE1 through signalling by a base station.

Preferably, UE1_ESequence1 may also be formed by 10 random access sequences selected according to a preset principle, and the preset principle is a default configuration of a standard or sent to UE1 through signalling by the base station; and the 10 random access sequences may include the same random access sequences.

Preferably, the principle for UE1 to select the ERAR for sending the enhanced random access sequence may also be as follows:

the ERARs of which the number of the sending units of a random access sequence are more than or equal to the number of sending units required by the sending of the enhanced random access sequence are selected from the ERAR set to form the set to be selected at first, and then the ERAR is randomly selected from the set to be selected.

(4) The base station detects the enhanced random access sequence UE1_ESequence1 sent by UE1 on ERAR2, and sends a random access response message to UE1.

(5) UE1 detects the random access response message sent for UE1_ESequence1 by the base station within a time bucket of which a length is Tj at the end of ERAR2; and related information of $T_{RAR}$ is also a default configuration of a standard or sent to UE1 through signalling by the base station.

As a preferred implementation mode, if UE1 detects the random access response message sent for UE1_ESequence1 by the base station within the time bucket of which the length is $T_{RAR}$, a subsequent random access flow is finished according to the random access response message.

If UE1 does not detect the random access response message sent for UE1_ESequence1 by the base station within the time bucket of which the length is $T_{RAR}$, UE1 may select the next available ERAR2-type ERAR to resend the enhanced random access sequence, for example, UE1_ESequence1 is resent or more repeats of the random access sequence Sequence1 are resent.

By the embodiment, the sending method and device and receiving method and device for the random access sequence are provided, and the random access sequence is sent and received on the preset random access resources, so that the problem that the access requirement cannot be met by the random access sequence processing method in the related art is solved, and access efficiency and accuracy are improved. It is important to note that the technical effects are not peculiar to all the abovementioned implementation modes, and some technical effects can be achieved only by some preferred implementation modes.

Obviously, those skilled in the art should know that each component or step of the embodiments of the disclosure can be implemented by a universal computing device, and the components or steps can be concentrated on a single computing device or distributed on a network formed by a plurality of computing devices, and can optionally be implemented by programmable codes executable for the computing devices, so that the components or steps can be stored in a storage device for execution with the computing devices, or can form each integrated circuit component, or multiple components or steps therein can form a single integrated circuit component for implementation. As a consequence, the disclosure is not limited to any specific hardware and software combination.

The above is only the preferred embodiment of the disclosure and not intended to limit the disclosure, and for those skilled in the art, the disclosure can have various modifications and variations. Any modifications, equivalent replacements, improvements and the like within the spirit and principle of the disclosure shall fall within the scope of protection of the disclosure.

INDUSTRIAL APPLICABILITY

The technical solutions provided by the embodiments of the disclosure may be applied to the field of user communication equipment, and a random access signal is sent and received on one or more preset random access resources forming a PRACH, so that the problem that an access requirement cannot be met by a random access sequence processing method in the related art is solved, and the effect of improving random access efficiency and accuracy is further achieved.

The invention claimed is:

1. A method for sending a random access sequence, comprising:
   determining one or more preset random access resources forming a Physical Random Access Channel (PRACH), wherein each of the one or more preset random access resources comprises $K_{Unit}$ sending units of a random access sequence, and $K_{Unit}$ is a positive integer more than or equal to 1; and
   sending a first random access sequence on the one or more preset random access resources;
   when the first time interval is determined to be after the preset random access resources for sending the first random access sequence and the random access response corresponding to the first random access sequence is not detected within the first time interval, the first time interval being the time interval of which the time length is $T_{RAR}$ after the sending time of the first random access sequence, the starting time and duration information of $T_{RAR}$ are configured by the system or notified to the UE by the base station, sending a fourth random access sequence on the preset random access resources after the preset random access resources for sending the first random access sequence.

2. The method according to claim 1, wherein each of the one or more preset random access resources comprises $K_{Unit}$ sending units of a random access sequence, and the step of sending the first random access sequence on the one or more preset random access resources comprises:
   selecting one preset random access resource from the one or more preset random access resources; and
   sending the first random access sequence on the selected preset random access resource.

3. The method according to claim 2, wherein the random access resource is selected from a random access resource set in one of manners as follows:
   the number of sending units of the selected preset random access resource is the same as a first number, the first number is the same as the number of the sending units corresponding to the first random access sequence;
   the preset random access resources of which the numbers of the sending units of the random access sequence are more than or equal to the first number are selected from the preset random access resource set to form a set to be selected; the preset random access resource is selected from the set to be selected in one of manners as follows: the preset random access resource of which the number of the sending units of the random access sequence is the smallest is selected from the set to be selected; any one preset random access resource meeting a preset condition is selected from the set to be selected; and the preset random access resource is randomly selected from the set to be selected.

4. The method according to claim 1, wherein the fourth random access sequence is one of:
   the first random access sequence;
   a sequence of which a sequence length is greater than that of the first random access sequence; and
   a sequence of which the repetitive structure number is larger than the repetitive structure number of the first random access sequence.

5. The method according to claim 1, wherein the first random access sequence comprises one of:
   a second random access sequence preset by the system or notified to the UE by the base station; and
   a third random access sequence obtained by extension of the second random access sequence.

6. The method according to claim 5, wherein the third random access sequence comprises one of:
   a sequence obtained by repeating the second random access sequence for N times; and a sequence obtained by selecting N random access sequences according to the second random access sequence and combining the N random access sequences, wherein N is a positive integer more than or equal to 1.

7. The method according to claim 6, wherein when each of the one or more preset random access resources comprises $K_{Unit}$ sending units of a random access sequence, N is smaller than or equal to $K_{Unit}$;

when the third random access sequence is the sequence obtained by repeating the second random access sequence for N times, an index of the third random access sequence is in a mapping relationship with N.

8. The method according to claim 7, wherein the N selected random access sequences comprise the same sequences.

9. The method according to claim 1, wherein a length $T_{E\_PRACH}$ of each preset random access resource on the time domain is preset by the system or notified to the UE by the base station; and a starting location $T_{E\_PRACH\_Start}$ of each preset random access resource on the time domain is preset by the system or notified to the UE by the base station.

10. The method according to claim 9, wherein $T_{E\text{-}PRACH}$ is $M_{frame}$ frames or $M_{subframe}$ subframes, values of $M_{frame}$ and $M_{subframe}$ are preset by the system or notified to the UE by the base station, and both $M_{frame}$ and $M_{subframe}$ are positive integers more than or equal to 1; or $T_{E\_PRACH\_Start}$ is an index number of a frame or an index number of a subframe.

11. A method for receiving a random access sequence, comprising:

detecting a first random access sequence on preset random access resources; and sending a random access response corresponding to the first random access sequence;

wherein a length $T_{E\_PRACH}$ of each preset random access resource on the time domain is preset by the system or notified to the UE by the base station; and a starting location $T_{E\_PRACH\_Start}$ of each preset random access resource on the time domain is preset by the system or notified to the UE by the base station;

$T_{E\text{-}PRACH}$ is $M_{frame}$ frames or $M_{subframe}$ subframes, values of $M_{frame}$ and $M_{subframe}$ are preset by the system or notified to the UE by the base station, and both $M_{frame}$ and $M_{subframe}$ are positive integers more than or equal to 1;

$T_{E\_PRACH\_Start}$ is an index number of a frame or an index number of a subframe.

12. The method according to claim 11, wherein each of the one or more preset random access resources comprises $K_{Unit}$ sending units of a random access sequence, and $K_{Unit}$ is a positive integer more than or equal to 1.

13. The method according to claim 11, wherein the first random access sequence comprises one of:

a second random access sequence preset by the system or notified to the UE by the base station; and a third random access sequence obtained by extension of the second random access sequence.

14. The method according to claim 13, wherein the third random access sequence comprises one of:

a sequence obtained by repeating the second random access sequence for N times; and a sequence obtained by selecting N random access sequences according to the second random access sequence and combining the N random access sequences, wherein N is a positive integer more than or equal to 1.

15. The method according to claim 14, wherein when each of the one or more preset random access resources comprises $K_{Unit}$ sending units of a random access sequence, N is smaller than or equal to $K_{Unit}$; or the N selected random access sequences comprise the same sequences; or when the third random access sequence is the sequence obtained by repeating the second random access sequence for N times, an index of the third random access sequence is in a mapping relationship with N.

16. A device for sending a random access sequence, comprising:

a determination component, configured to determine one or more preset random access resources forming a Physical Random Access Channel (PRACH), wherein each of the one or more preset random access resources comprises $K_{Unit}$ sending units of a random access sequence, and $K_{Unit}$ is a positive integer more than or equal to 1; and a first sending component, configured to send a first random access sequence on the one or more preset random access resources;

the device is further configured to, when the first time interval is determined to be after the preset random access resources for sending the first random access sequence and the random access response corresponding to the first random access sequence is not detected within the first time interval, the first time interval being the time interval of which the time length is $T_{RAR}$ after the sending time of the first random access sequence, the starting time and duration information of $T_{RAR}$ are configured by the system or notified to the UE by the base station, send a fourth random access sequence on the preset random access resources after the preset random access resources for sending the first random access sequence.

17. A device for receiving a random access sequence, comprising:

a detection component, configured to detect a first random access sequence on preset random access resources; and a second sending component, configured to send a random access response corresponding to the first random access sequence;

wherein a length $T_{E\_PRACH}$ of each preset random access resource on the time domain is preset by the system or notified to the UE by the base station; and a starting location $T_{E\_PRACH\_Start}$ of each preset random access resource on the time domain is preset by the system or notified to the UE by the base station;

$T_{E\text{-}PRACH}$ is $M_{frame}$ frames or $M_{subframe}$ subframes, values of $M_{frame}$ and $M_{subframe}$ are preset by the system or notified to the UE by the base station, and both $M_{frame}$ and $M_{subframe}$ are positive integers more than or equal to 1;

$T_{E\_PRACH\_Start}$ is an index number of a frame or an index number of a subframe.

\* \* \* \* \*